(12) United States Patent
Fitzgerald et al.

(10) Patent No.: US 12,055,952 B2
(45) Date of Patent: Aug. 6, 2024

(54) AUTONOMOUS VEHICLES INCLUDING LADDERS AND RELATED METHODS

(71) Applicant: Ocado Innovation Limited, Hatfield (GB)

(72) Inventors: Matthew Fitzgerald, Boston, MA (US); Michael Caine, Needham, MA (US); Christopher Cacioppo, Somerville, MA (US)

(73) Assignee: Ocado Innovation Limited, Hatfield (GB)

( * ) Notice: Subject to any disclaimer, the term of this patent is extended or adjusted under 35 U.S.C. 154(b) by 303 days.

(21) Appl. No.: 17/370,792

(22) Filed: Jul. 8, 2021

(65) Prior Publication Data
US 2023/0008183 A1    Jan. 12, 2023

(51) Int. Cl.
*G05D 1/81* (2024.01)
*G01G 19/08* (2006.01)
*G05D 1/228* (2024.01)

(52) U.S. Cl.
CPC .............. *G05D 1/81* (2024.01); *G01G 19/08* (2013.01); *G05D 1/228* (2024.01)

(58) Field of Classification Search
CPC ....................................................... E06C 5/24
See application file for complete search history.

(56) References Cited

U.S. PATENT DOCUMENTS

| | | | |
|---|---|---|---|
| 5,064,022 A * | 11/1991 | Graham | B60R 3/02 182/208 |
| 9,834,380 B2 | 12/2017 | Hamilton et al. | |
| 2004/0173406 A1* | 9/2004 | Lantz | B60R 3/005 182/127 |
| 2009/0038885 A1* | 2/2009 | Ellement | E06C 5/06 280/163 |

(Continued)

FOREIGN PATENT DOCUMENTS

| | | | |
|---|---|---|---|
| JP | H03133899 A | 6/1991 | |
| JP | 2009249050 A * | 10/2009 | |

(Continued)

OTHER PUBLICATIONS

Canadian Intellectual Property Office, "Office Action," issued in connection with Canadian Patent Application No. 3,159,247, dated Nov. 16, 2023, 5 pages.

(Continued)

*Primary Examiner* — Ryan Rink
(74) *Attorney, Agent, or Firm* — Hanley, Flight & Zimmerman, LLC

(57) ABSTRACT

Autonomous vehicles including ladders and related methods are disclosed. An example system includes an autonomous vehicle including an integrated ladder and a processor to detect a state of the ladder as being in one of a stowed state, a deployed state, or a use state; in response to detecting that the ladder is in the stowed state, cause the autonomous vehicle to operate in a first drive mode and a second drive mode; in response to detecting that the ladder is in the (Continued)

deployed state, cause the autonomous vehicle to operate in the second drive mode and to restrict from operating in the first drive mode; and in response to detecting that the ladder is in the use state, cause the autonomous vehicle to refrain from operating in the first drive mode and the second drive mode.

19 Claims, 8 Drawing Sheets

(56) References Cited

U.S. PATENT DOCUMENTS

| | | | | |
|---|---|---|---|---|
| 2012/0145480 | A1* | 6/2012 | Willis | E06C 5/36 |
| | | | | 182/127 |
| 2013/0238117 | A1* | 9/2013 | Yagawa | G05B 19/41895 |
| | | | | 700/228 |
| 2017/0144604 | A1* | 5/2017 | Doy | B60R 3/02 |
| 2017/0246992 | A1* | 8/2017 | Giesmann | E06C 5/24 |
| 2018/0022405 | A1 | 1/2018 | Gecchelin et al. | |
| 2022/0179416 | A1 | 6/2022 | Cacioppo | |
| 2022/0250844 | A1 | 8/2022 | Kreis et al. | |
| 2022/0318705 | A1* | 10/2022 | Reaume | G01M 99/005 |

FOREIGN PATENT DOCUMENTS

| | | |
|---|---|---|
| JP | 2012001364 A | 1/2012 |
| JP | 2013238050 A | 11/2013 |

OTHER PUBLICATIONS

European Patent Office, "Extended European Search Report," issued in connection with European Patent Application No. 22169384.9, dated Oct. 24, 2022, 9 pages.

* cited by examiner

AUTONOMOUS VEHICLES INCLUDING LADDERS AND RELATED METHODS

FIELD OF THE DISCLOSURE

This disclosure relates generally to autonomous vehicles and, more particularly, to autonomous vehicles including ladders and related methods.

BACKGROUND

An autonomous vehicle may be used, for instance, in a warehouse or other environment that stores inventory to assist a user in carrying inventory from a location where the inventory is stored to another location within the warehouse or external to the warehouse.

Figure 1:
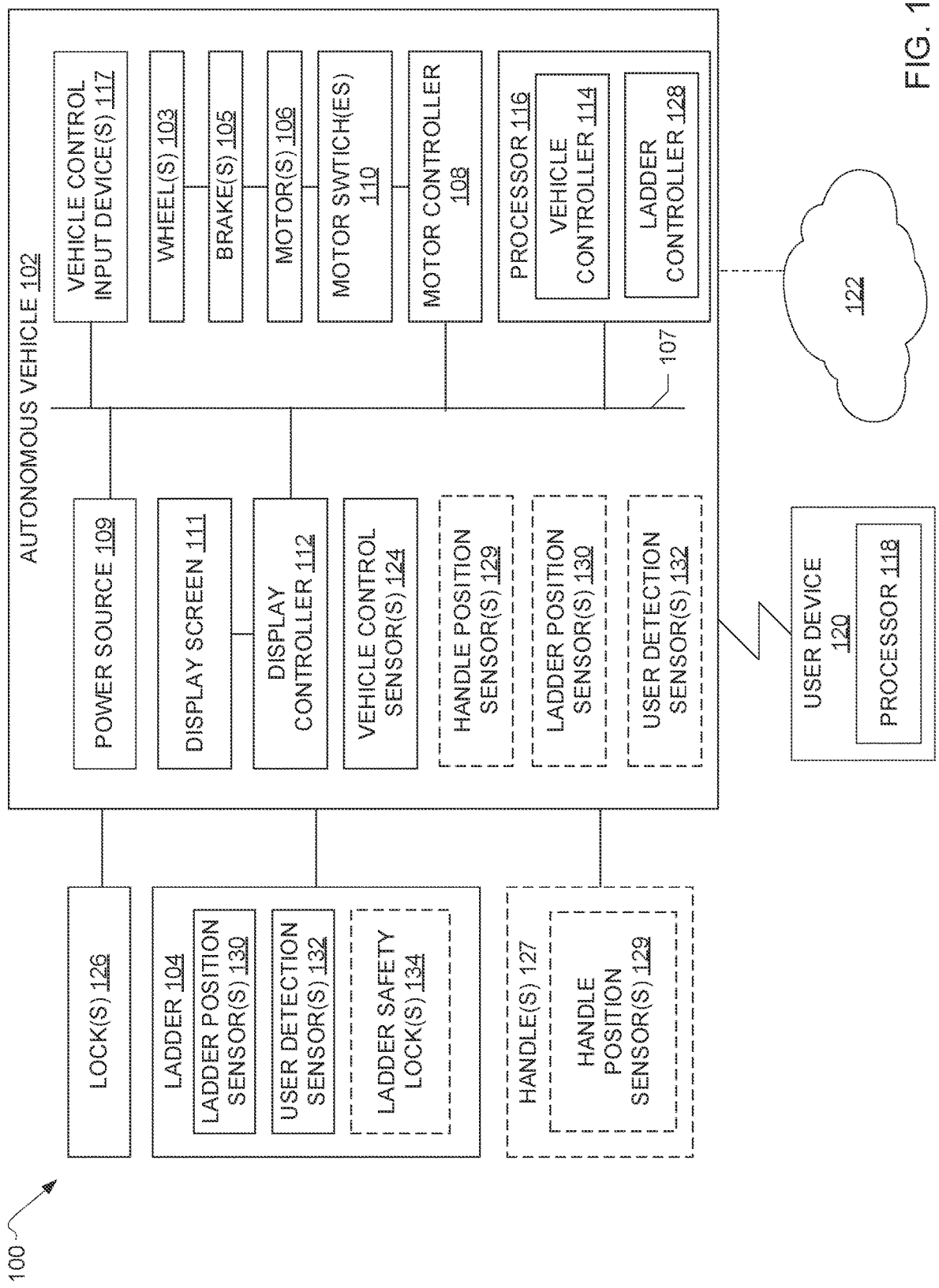
FIG. 1 illustrates an example system constructed in accordance with teachings of this disclosure and including an example autonomous vehicle, an example ladder of the autonomous vehicle, and an example ladder controller for controlling a drive mode of the autonomous vehicle based on a state of the ladder.

The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular. In general, the same reference numbers will be used throughout the drawing(s) and accompanying written description to refer to the same or like parts. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

DETAILED DESCRIPTION

A footprint of some warehouses or other environments that store inventory may be limited based on available real estate. Such warehouses may use shelves to store the inventory. However, a height of a shelf may result in certain inventory being beyond the reach of an individual from a floor of the warehouse.

A ladder (e.g., a step ladder) may be used by a worker to reach inventory located on a shelf that cannot otherwise be reached by the worker from the warehouse floor. Some known carts that hold the inventory retrieved from the shelf by the worker include hook(s) or other means for removably securing a ladder to the cart. For instance, when arriving at a location that involves use of the ladder, the worker may unhook the ladder from the cart, open or unfold the ladder at the location near the inventory to be retrieved, ascend the ladder to retrieve the inventory, descend the ladder, close or fold the ladder, and return the ladder to the hook(s) on the cart.

Further, workplace safety regulations define standards or features with respect to ladder design and/or use. For instance, a safety regulation may require the ladder to enable a user to maintain three points of contact with the ladder while using the ladder.

Disclosed herein are example autonomous vehicles (e.g., autonomous carts) that include a ladder integrated with (e.g., coupled to) the autonomous vehicle. Example autonomous vehicles and systems disclosed herein regulate access to the ladder and operation of the autonomous vehicle via one or more safety interlocks (hardware and/or software interlocks) to provide for safe use of the ladder and with the vehicle. Examples disclosed herein include a ladder controller to determine a state of the ladder (e.g., a stowed state, an in-use state) based on data generated by sensor(s) of the ladder and/or the vehicle. In examples disclosed herein, the ladder controller regulates autonomous movement of the vehicle based on the state of the ladder. For instance, the ladder controller can restrict an autonomous movement of the vehicle when the ladder is in-use (e.g., a user has ascended the ladder). In some examples disclosed herein, the ladder controller regulates use of a manual mode of the vehicle, or a drive mode in which the user can manually position the vehicle by, for instance, providing input(s) (e.g., via vehicle control button(s)) and/or by applying force (e.g., pushing the cart), based on the state of the ladder. Examples disclosed herein dynamically respond to the state of the ladder with respect to operation of the autonomous vehicle to provide for safe use of the ladder and efficient use of the vehicle.

Some examples disclosed herein provide for improved efficiency in ladder usage and/or vehicle usage by learning from user behavior associated with ladder usage. Some examples disclosed herein implement neural-network models to refine instructions with respect to automated positioning of the vehicle at locations in the warehouse associated with use of the ladder. In some examples disclosed herein, hardware and/or mechanical safety interlocks are used in addition to or as an alternative to software-based safety interlocks to provide for and/or maintain safe use of the ladder and the autonomous vehicle.

FIG. 1 illustrates an example system 100 constructed in accordance with teachings of this disclosure for providing safety interlocks with respect to operation of an autonomous vehicle 102 based on a state of a ladder 104 of the autonomous vehicle 102. The autonomous vehicle 102 of FIG. 1 can include, for example, a cart including one or more shelves for carrying inventory (e.g., one or more objects) retrieved from a storage location in a warehouse or other environment.

The example autonomous vehicle 102 of FIG. 1 includes one or more motors 106 (e.g., electric motor(s) and/or other drive mechanism(s)) to cause movement of the vehicle 102 via wheel(s) 103 of the vehicle 102. The example vehicle 102 includes a motor controller 108 and one or more motor switches 110 to control operation of the motor(s) 106. The motor controller 108 includes electronics (e.g., hardware and software component(s)) to control, for example, a speed of the vehicle. The motor switches 110 can control a flow of current to the motor(s) 106 based on, for example, instructions generated by the motor controller 108. The example vehicle 102 includes brake(s) 105, or more generally, braking mechanism(s) that serve as means for slowing or stopping movement of the vehicle 102. The vehicle 102 of FIG. 1 includes a power source 109 such as a battery to provide power to the motor(s) 106 and other components of the vehicle 102 communicatively coupled via a bus 107. A housing or frame of the vehicle 102 carries, contains, encloses, and/or otherwise supports electrical component(s) of the vehicle 102 that enable operation of the vehicle 102.

The example vehicle 102 of FIG. 1 includes a display screen 111 to present data to a user of the vehicle 102. In some examples, the display screen 111 is a touch screen to enable the user to interact with data presented on the display screen 111 by touching the screen 111. A display controller 112 (e.g., a graphics processing unit (GPU)) of the example vehicle 102 of FIG. 1 controls operation of the display screen 111 and facilitates rending of content (e.g., display frame(s) associated with graphical user interface(s)) via the display screen 111.

The example autonomous vehicle 102 includes a vehicle controller 114 to control movement of the autonomous vehicle 102. In the example of FIG. 1, the vehicle controller 114 is implemented by a processor 116 of the vehicle 102. The example vehicle controller 114 of FIG. 1 controls autonomous movement or locomotion of the vehicle 102 in a first drive mode, or an autonomous drive mode. In the autonomous drive mode, the vehicle 102 moves to a location in an environment without or with limited user input control at the vehicle 102 during movement of the vehicle 102.

In examples disclosed herein, the autonomous vehicle 102 can also operate in a second drive mode, or a manual mode. In some examples, the manual mode includes a manual drive mode in which the vehicle 102 moves in response to input(s) received from the user of the vehicle 102 via vehicle control input device(s) 117 of the vehicle 102 (e.g., control button(s)). The manual drive mode enables the user to control movement of the vehicle 102 by driving or positioning the vehicle 102 via the vehicle control input device(s) 117. In other examples, the manual mode includes a user-powered mode in which the user applies force (e.g., muscle power) to cause the vehicle 102 to move. For instance, in the user-powered mode, the wheel(s) 103 can rotate about their respective axes to enable the user to move (e.g., push) the vehicle 102. In some examples, the user-powered mode is a partially assisted user-powered mode. For instance, the motor controller 108 can cause the motor(s) 106 to generate power in response to detection of force applied by the user to assist the user in moving (e.g., pushing) the vehicle 102. In some examples, the user may release the brake(s) 105 and/or perform another action at the vehicle 102 to enable the autonomous vehicle 102 to operate in the manual mode (e.g., the manual drive mode, the user-powered mode).

When the vehicle 102 is operating in the autonomous drive mode, the vehicle controller 114 determines a trajectory for the vehicle 102 in the environment to cause the vehicle 102 to drive to a location in the environment and to stop (e.g., park) at the location when the vehicle 102 arrives at the location. The vehicle controller 114 can determine the trajectory of the vehicle 102 based on user input(s) received at the vehicle 102 (e.g., touch input(s) received via the display screen 111) and/or user-defined rule(s). For example, a user input can include an object to be retrieved from a warehouse in which the vehicle 102 disposed. The example vehicle controller 114 of FIG. 1 can determine a trajectory of the vehicle 102 to the location of the object in the warehouse based on the user input and previously defined rule(s) indicating a location of the object in the warehouse. The vehicle controller 114 generates instructions to cause the vehicle 102 to travel to the location of the object and to park at the location to enable the user to retrieve the object.

In some examples, the on-board processor 116 of the vehicle 102 is communicatively coupled to a processor 118 of a user device 120, such as a smartphone or a wearable device such as a smartwatch. In some examples, the processor 116 of the vehicle 102 is communicatively coupled to a cloud-based device 122 (e.g., one or more server(s), processor(s), and/or virtual machine(s)). The processor 116 of the vehicle 102 is communicatively coupled to the processor 118 of the user device 120 and/or the cloud-based device(s) 122 via wireless connections (e.g., Wi-Fi, Bluetooth connections). In some such examples, the vehicle controller 114 determines a trajectory for the vehicle 102 based on instructions received from one or both of the processor(s) 118, 122. For instance, such instructions can indicate an object to be retrieved from the warehouse. In other examples, the instructions received from the processor(s) 118, 122 include the trajectory for the vehicle 102 and the vehicle controller 114 executes the instructions. For instance, the instructions from the processor(s) 118, 122 can include a trajectory of the vehicle 102 to a location in the warehouse including an object to be retrieved.

The vehicle controller 114 transmits the instructions with respect to autonomous locomotion of the vehicle 102 to the motor controller 108 to cause the motor(s) 106 to move the vehicle 102. The instructions can define, for example, a direction in which the vehicle 102 is to travel, a speed of the vehicle 102, etc. The example autonomous vehicle 102 of FIG. 1 includes one or more vehicle control sensor(s) 124 to provide information to the vehicle controller 114 with respect to, for example, a location of the vehicle 102 in the environment (e.g., the warehouse), an orientation of the vehicle 102 in the environment, and/or a proximity of the vehicle 102 (e.g., a housing of the vehicle 102) relative to external object(s) in the environment (e.g., to detect a potential collision). The vehicle control sensor(s) 124 can include, for example, image sensor(s), a satellite-based geographical positioning system (e.g., a global position system (GPS), GLONASS, BeiDou, Galileo), optical sensor(s), and/or other types of sensors. The vehicle controller 114 analyzes data from the vehicle control sensor(s) 124 to, for example, adjust a trajectory of the vehicle 102 and generate corresponding instructions based on the sensor data.

When the example autonomous vehicle 102 of FIG. 1 arrives at a location designated in the instructions generated by the vehicle controller 114, the user device 120, and/or the cloud-based device(s) 122, the motor controller 108 instructs the vehicle 102 to stop movement (e.g., park) at the location. In some examples, the instructions include a position at which the vehicle 102 should stop at the location. For instance, the instructions can specify that the vehicle 102 should park such that the vehicle 102 is disposed alongside a shelf in the warehouse and a rear end of the vehicle is located approximately one foot in front of the location of the object on the shelf so as not to block access to the object on the shelf.

In some examples, a user of the vehicle 102 may operate the vehicle 102 in the manual mode (e.g., the manual drive mode, the user-powered mode) after the vehicle 102 has arrived at a location via the autonomous drive mode. For instance, in the manual drive mode, the user can provide input(s) via the vehicle control input device(s) 117 to move (e.g., re-position) the vehicle 102 at a location in a warehouse where an object to be retrieved is stored. When the vehicle 102 is operating in the manual drive mode, one or more of the vehicle controller 114 and/or the motor controller 108 can detect signal(s) output by the vehicle control input device(s) 117 of the vehicle 102 in response to input(s) provided by the user at the vehicle 102. In response to the input(s), the vehicle controller 114 and/or the motor controller 108 generate instructions to cause the motor(s) 106 to move the vehicle 102 based on the user input(s) defining, for example, a direction in which the vehicle 102 should move. In some examples, the vehicle controller 114 and/or the motor controller 108 limits a speed at which the vehicle 102 moves when the vehicle 102 is operating in the manual mode and/or causes the brake(s) 105 to activate to limit movement of the vehicle 102 by the user.

In the example of FIG. 1, the ladder 104 is integrated with the autonomous vehicle 102 such that a frame of the autonomous vehicle 102 supports at least a portion of the ladder 104 during movement of the vehicle 102 in the autonomous drive mode. The ladder 104 includes one or more steps to support a user. In some examples, the ladder 104 is coupled to one or more portions of the frame of the vehicle 102 via mechanical fasteners and the vehicle 102 carries the ladder 104 in a folded position during autonomous movement of the vehicle 102. In some examples, at least a portion of the ladder 104 is moveable relative to the frame of the vehicle 102 to enable the ladder 104 to move from a folded position to an unfolded position. In some examples, at least a portion of the ladder 104 remains coupled to the frame of the vehicle 102 when the ladder 104 is unfolded or deployed.

In other examples, the ladder 104 is carried by the frame of the vehicle 102 in a folded position during movement of the vehicle 102 and can be removed by a user from the vehicle frame for use when the vehicle 102 is parked. In some such examples, the ladder 104 can be unfolded for use when the ladder 104 is removed from the vehicle frame. In other such examples, the ladder 104 can be removed from the frame and (re-)coupled to designated portion(s) of the vehicle frame when the vehicle 102 is parked, where the other designated portion(s) of the vehicle frame support the ladder 104 in an unfolded position.

In the example of FIG. 1, the ladder 104 moves between a stowed state, an unlocked state, a deployed state, and an in-use. When the ladder 104 is in the stowed state, the ladder is secured (e.g., locked) in a folded position to the frame of the vehicle 102 via one or more locks 126. In the example of FIG. 1, the lock(s) 126 include electrically operated lock(s) 126 to prevent a user from deploying the ladder 104 until the vehicle 102 has arrived a location where use of the ladder 104 is permitted based on, for example, one or more properties of the inventory to be retrieved at the location, such as a height of a shelf where an object to be retrieved is located.

In examples disclosed herein, the example ladder 104 is in the unlocked state when the lock(s) 126 are unlocked and at least a portion of the ladder 104 is folded. In examples disclosed herein, the ladder 104 is in the deployed state when the ladder 104 is unlocked from the frame of the vehicle 102 and unfolded. In examples disclosed herein, the ladder 104 is in the in-use state when at least a portion of a body of a user or an object is in contact with the ladder 104. To prevent harm to the user of the vehicle 102, other users in the environment, and/or the vehicle 102 when the ladder 104 is in the unlocked state, the deployed state, or the in-use state, movement of the vehicle 102 is regulated (e.g., restricted, prevented) when the ladder 104 is in these states. In the example of FIG. 1, a ladder controller 128 controls deployment of the ladder 104 from the stowed state and regulates (e.g., restricts, prevents) movement of the vehicle 102 when ladder 104 is in the unlocked state, the deployed state, and the in-use state.

In the example of FIG. 1, the ladder controller 128 is implemented by instructions executed on the processor 116 of the vehicle 102. However, in other examples, the ladder controller 128 is implemented by instructions on the processor 118 of the user device 120 and/or on the cloud-based device(s) 122. In other examples, the ladder controller 128 is implemented by dedicated circuitry located on one or more of the vehicle 102 and/or the user device 120. In some examples, one or more components of the example ladder controller 128 are implemented by the on-board processor 116 of the vehicle 102 and one or more other components are implemented by the processor 118 of the user device 120 and/or the cloud-based device(s) 122. These components may be implemented in software, firmware, hardware, or in combination of two or more of software, firmware, and hardware.

In the example system 100 of FIG. 1, the ladder controller 128 determines when the autonomous vehicle 102 has arrived at a location in an environment (e.g., a warehouse) where use of the ladder 104 is permitted. As disclosed herein, the ladder controller 128 can determine that the location is associated with permitted ladder usage based on position information generated by the vehicle control sensor(s) 124 and rule(s) (e.g., user-defined rule(s)) that associate location(s) in the environment with usage of a ladder. For example, the ladder usage rule(s) can associate a location in a warehouse with permitted ladder usage based on a height of a shelf on which an object is stored at the location. Based on the position information from the vehicle control sensor(s) 124 indicating that the vehicle 102 has arrived at a location associated with ladder usage, the ladder controller 128 generates instructions to cause the lock(s) 126 to unlock to enable a user to deploy or unfold the ladder 104.

In some examples, the vehicle 102 includes one or more handle(s) 127. As disclosed herein, in some examples, the handle(s) 127 are separately coupled to the frame of the vehicle 102 and/or separately movable relative to the vehicle frame from the ladder 104. For instance, the handle(s) 127 can move between a folded state and an unfolded state relative to the vehicle frame independent of movement of the ladder 104. In other examples, the ladder 104 includes the handle(s) 127. In some examples, the handle(s) 127 include handle position sensor(s) 129 to output signal(s) indicative of movement of portion(s) of the handle(s) 127 (e.g., to indicate a change in position of the handle(s) from the folded state to the unfolded state). In some examples, the handle position sensor(s) 129 include image sensor(s) (e.g., camera(s)) to generate image data that is analyzed by the ladder controller 128 using machine vision to recognize, for instance, that the handle(s) 127 are in the folded state or the unfolded state. In some examples, the handle position sensor(s) 129 are additionally or alternatively carried by (e.g., coupled to) the frame of the vehicle 102. For instance, the handle position sensor(s) 129 carried by the vehicle frame can include proximity sensor(s) to output signal(s) indicative of a proximity of one or more portions of the handle(s) 127 to the frame of the vehicle 102, thereby indicating that the handle(s) 127 are in a folded state.

In such examples, the ladder controller 128 receives and processes the sensor data from the handle position sensor(s) 129 to predict or identify a state of the handle(s) 127. The ladder controller 128 generates the instruction(s) for the lock(s) 126 to unlock the ladder 104 in response to data from the handle position sensor(s) 129 indicating that the handle(s) 127 are in an unfolded state. The relationship between unfolding of the handle(s) 127 and the release of the ladder lock(s) 126 prevents or reduces instances in which a user attempts to use the ladder 104 without the handle(s) 127 being deployed.

The example ladder 104 of FIG. 1 includes one or more ladder position sensor(s) 130. The ladder position sensor(s) 130 can include, for example, sensor(s) that output signals indicative of movement of portion(s) of the ladder (e.g., to indicate a change in position of the ladder 104 from the folded state to the unfolded state). The ladder position sensor(s) 130 can include proximity sensor(s) to output signal(s) indicative of a change in position of the ladder 104 relative to, for instance, the frame of the vehicle 102. In some examples, the ladder position sensor(s) 130 include image sensor(s) (e.g., camera(s)) to generate image data that is analyzed by the ladder controller 128 using machine vision to recognize, for instance, that the ladder 104 is in the folded state or the unfolded state. In some examples, the ladder position sensor(s) 130 are additionally or alternatively carried by (e.g., coupled to) the frame of the vehicle 102. For instance, the ladder sensor(s) 130 carried by the vehicle frame can include proximity sensor(s) that output signal(s) indicative of proximity one or more portions of the ladder 104 to the frame of the vehicle 102, thereby indicating that the ladder 104 is in a folded state.

The example ladder 104 of FIG. 1 includes one or more user detection sensors 132 to detect a presence of a user (or an object) on the ladder 104. The user detection sensor(s) 132 can include weight sensor(s) that output signal(s) indicative of a change in weight at the ladder 104, thereby indicating contact between the ladder and at least a portion of a user and/or an object. In some examples, the user detection sensor(s) 132 include image sensor(s) (e.g., camera(s)) to generate image data that is analyzed by the ladder controller 128 using machine vision to recognize, for instance, that at least a portion of a body of the user is in contact with the ladder. In some examples, the user detection sensor(s) 132 are additionally or alternatively carried by (e.g., coupled to) the frame of the vehicle 102. For instance, camera(s) can be coupled to the frame of the vehicle 102 to generate image data capturing a position of the user relative to the ladder 104. Based on the image data, the ladder controller 128 can recognize that the user has ascended the ladder 104.

In the example system 100 of FIG. 1, the ladder controller 128 receives and processes the sensor data from the sensor(s) 130, 132 to predict or identify a state of the ladder 104. In examples disclosed herein, the ladder controller 128 analyzes the sensor data to determine if the ladder 104 is in the stowed state (e.g., the ladder 104 is folded and the lock(s) 126 are engaged to secure the ladder 104 to the vehicle frame), the unlocked state (e.g., the lock(s) 126 are released but the ladder 104 at least partially folded), the deployed state (e.g., the lock(s) 126 are released and the ladder 104 is unfolded), or the in-use state (e.g., at least a portion of a body of a user or an object is in contact with the ladder 104). The ladder controller 128 generates instructions to control (e.g., restrict, prevent) a drive mode of the autonomous vehicle 102 based on the state of the ladder 104. In particular, based on the state of the ladder 104, the ladder controller 128 generates instructions to (a) permit the vehicle 102 to operate in the autonomous drive mode and the manual mode (e.g., the manual drive mode, the user-powered mode), (b) permit the vehicle 102 to operate the manual mode and prevent or limit operating in the autonomous drive mode, or (c) prevent the vehicle 102 from operating in either the autonomous drive mode or the manual mode.

For example, as disclosed herein, the ladder controller 128 can determine that the ladder 104 is in the stowed state based on sensor data generated by the ladder position sensor(s) 130 and the electric lock(s) 126. In response, the ladder controller 128 determines that, because the ladder is stowed, the vehicle 102 is permitted to operate in the autonomous drive mode and the manual mode.

In examples disclosed herein, the ladder controller 128 can determine that the ladder 104 is in the unlocked state based on based on sensor data generated by the ladder position sensor(s) 130 and the electric lock(s) 126 indicating that the lock(s) 126 are unlocked but the ladder 104 is folded or substantially folded. In such examples, the ladder controller 128 generates instructions to restrict operation of the vehicle 102 in the autonomous drive mode because the ladder 104 is not secured to the vehicle 102. In some such examples, the ladder controller 128 permits operation of the vehicle 102 in the manual mode to enable the user to manually adjust (e.g., via the vehicle control input device(s) 117; by applying force to (e.g., pushing) the vehicle 102) a position of the vehicle 102 at the location.

In examples disclosed herein, the ladder controller 128 can determine that the ladder 104 is in the deployed state based on data from the ladder position sensor(s) 130 indicating that the ladder 104 is unfolded (e.g., data indicating that one or more portion(s) of the ladder 104 has moved away from the vehicle frame 104). However, based on data from the user detection sensor(s) 132, the ladder controller 128 may determine that the ladder 104 is not in use (i.e., no portion of a body of a user or an object is in contact with the ladder 104). In such examples, the ladder controller 128 generates instructions to restrict operation of the vehicle 102 in the autonomous drive mode, but to permit operation of the vehicle 102 in the manual mode. As disclosed herein, in some examples, operation of the vehicle 102 in the manual mode is permitted when the ladder is deployed to enable a user to manually position (e.g., via the vehicle control input device(s) 117; by applying force to (e.g., pushing) the vehicle 102) the vehicle 102 and, thus, the unfolded ladder 104, at a location where inventory is to be retrieved via the ladder 104.

In some examples, restriction of the autonomous drive mode of the vehicle 102 when the ladder 104 is in the unlocked state or the deployed state includes prevention of operation of the vehicle 102 in the autonomous drive mode (i.e., autonomous locomotion of the vehicle 102 is not permitted). In other examples, restriction of the autonomous drive mode of the vehicle 102 when the ladder 104 is in the unlocked state or the deployed state permits autonomous movement at reduced speeds as compared to the speed(s) at which the vehicle 102 can autonomously travel when the ladder 104 is in the stowed state.

In example disclosed herein, the ladder controller 128 can determine that the ladder 104 is in the in-use state based on data from the ladder position sensor(s) 130 indicating that the ladder 104 is unfolded and data from the user detection sensor(s) 132 indicating that at least a portion of a body of the user and/or an object is in contact with the ladder 104. As disclosed herein, in such examples, the ladder controller 128 generates instructions to prevent the motor(s) 106 of the vehicle 102 from operating and/or to activate the brake(s) 105 of the vehicle 102. For instance, the ladder controller 128 can transmit instructions to the motor controller 108 to cause the motor switch(es) 110 to prevent the motor(s) 106 from operating regardless of user input(s) received via the vehicle control input device(s) 117.

In some examples disclosed herein, the ladder controller 128 analyzes the sensor data from one or more of the handle position sensor(s) 129, the ladder position sensor(s) 130, and/or the user detection sensor(s) 132 to determine the state of the handle(s) 127, the state of the ladder 104, and the corresponding drive mode restrictions for the vehicle 102. However, in other examples, the sensor data from the sensor(s) 129, 130, 132 can additionally or alternatively be received and processed by the motor controller 108. The motor controller 108 can execute one or more rules to control operation of the vehicle 102 in response to a state of the handle(s) 127 and/or the ladder 104.

For example, the motor controller 108 can detect that the lock(s) 126 are in a locked state (e.g., based on signal(s) output by the electric lock(s) 126). In response, the motor controller 108 can control a state of the motor switch(es) 110 to enable a current to be provided to the motor(s) 106 in the autonomous drive mode and the manual mode (e.g., the manual drive mode). As another example, the motor controller 108 can restrict a speed at which the vehicle 102 moves in response to user input(s) received via the vehicle control input device(s) 117 based on signals output by the ladder position sensor(s) 130 indicating that the ladder is in the unlocked state or the deployed state.

In some examples, the motor controller 108 can detect that handle(s) 127 are in an unfolded position based on the data from the handle position sensor(s) 129. In response, the motor controller 108 can, for instance, restrict a speed at which the vehicle 102 moves in response to input(s) received via the vehicle control input device(s) 117.

As another example, in response to signal(s) output by weight sensor(s) (e.g., the user detection sensor(s) 132) indicative of weight on the ladder 104, the motor controller 108 can instruct the motor switch(es) 110 to prevent operation of the motor(s) 106 and, thus, movement of the vehicle 102. In such examples, the motor switch(es) 110 and/or the motor(s) 106 do not respond to input(s) received via the vehicle control input device(s) 117. Thus, the motor controller 108 can serve to supplement the analysis performed by the ladder controller 128 and/or as an alternative means for controlling operation of the vehicle 102 in view of a state of the ladder 104.

In some other examples, the sensor(s) 130, 132 are in (e.g., direct) communication with the brake(s) 105. In such examples, the brake(s) 105 can engage to prevent movement (e.g., all movement or, in some instances, only autonomous movement) of the vehicle 102 in response to signal(s) output by the sensor(s) 130, 132 indicating that the ladder 104 is in the in-use state.

In some examples, the sensor(s) 130, 132 are in(e.g., direct) communication with the motor switch(es) 110. In such examples, the motor switch(es) 110 can control current to the motor(s) 106 in response to signal(s) output by the sensor(s) 130, 132 indicating that the ladder 104 is in the in-use state. Thus, communicative couplings between the sensor(s) 130, 132 and the brake(s) 105 and/or the motor switch(es) 110 can supplement the analysis and control of the vehicle 102 performed by the ladder controller 128 and/or the motor controller 108. In other examples, communicative couplings between the sensor(s) 130, 132 and the brake(s) 105 and/or the motor switch(es) 110 can provide alternative means (e.g., hardware-driven means) for controlling operation of the vehicle 102 in view of a state of the ladder 104.

Additionally or alternatively, the ladder 104 can include one or more mechanical ladder safety locks 134 that engage in response to, for instance, weight placed on a portion of the ladder 104. The ladder safety lock(s) 134 can include, for example, lock step(s), spring-loaded caster(s), and/or other weight-actuated locking mechanisms. The engagement of the ladder safety lock(s) 134 can provide mechanical means for preventing or substantially interfering with movement of the vehicle 102 during deployment and/or use of the ladder 104.

Figure 2:
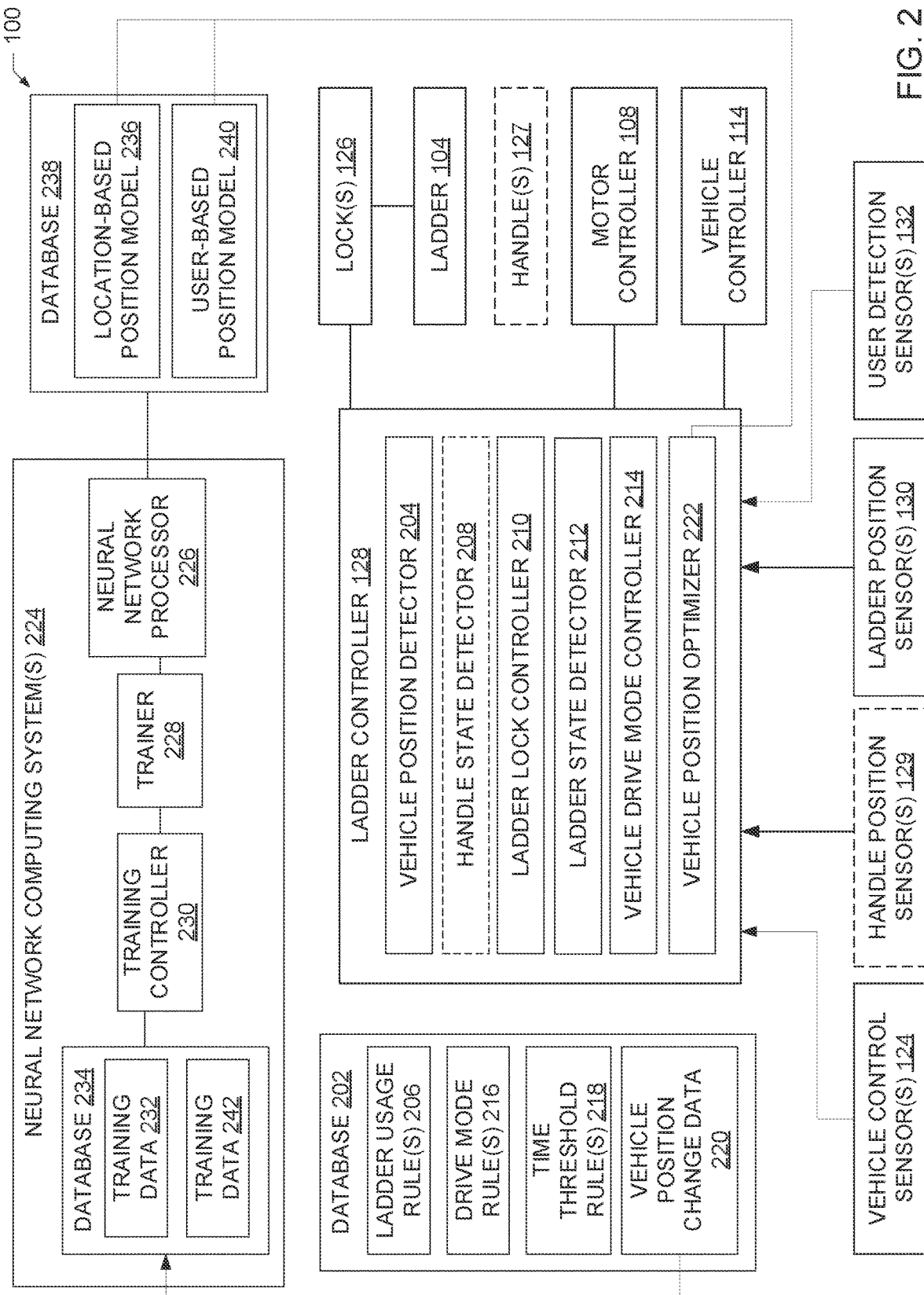
FIG. 2 is a block diagram of the example system of FIG. 1 including an example implementation of the ladder controller of FIG. 1 and one or more computing systems for training neural network(s) to generate model(s) for use during positioning of the autonomous vehicle in accordance with teachings of this disclosure.

FIG. 2 is a block diagram of an example implementation of the system 100 of FIG. 1 including an example implementation of the ladder controller 128. As mentioned above, the ladder controller 128 is constructed to control access to the ladder 104 of the autonomous vehicle 102 of FIG. 1 and to regulate a drive mode of the vehicle 102 based on a state of the ladder 104. In the example of FIG. 2, the ladder controller 128 is implemented by one or more of the processor 116 of the vehicle 102, the processor 118 of the user device 120, and/or cloud-based device(s) 122 (e.g., server(s), processor(s), and/or virtual machine(s) in the cloud 122 of FIG. 1). In some examples, some of the analysis is implemented by the ladder controller 128 via a cloud-computing environment and one or more other parts of the analysis is implemented by the processor 116 of the vehicle 102 and/or the processor 118 of a user device 120 such as a smartphone.

In examples disclosed herein, a ladder lock controller 210 of the example ladder controller 128 of FIG. 1 generates instructions to cause the lock(s) 126 to be activated to secure the ladder 104 to a frame of the vehicle 102 while the vehicle 102 moves in an environment (e.g., based on a trajectory defined by the vehicle controller 114). In such instances, the ladder 104 is in the stowed state. As disclosed herein, when the autonomous vehicle 102 arrives at a designated location in the environment (e.g., a warehouse), use of the ladder 104 may assist a user of the vehicle 102 at that location to, for instance, retrieve an object at the location.

In the example of FIG. 2, the example ladder controller 128 receives sensor data from the vehicle control sensor(s) 124 of the vehicle 102. The sensor data can indicate a position of the vehicle 102 in the environment. The sensor data from the vehicle control sensor(s) 124 can be stored in a database 202. In some examples, the ladder controller 128 includes the database 202. In other examples, the database is located external to the ladder controller 128 in a location accessible to the ladder controller 128 as shown in FIG. 2.

The example ladder controller 128 of FIG. 2 includes a vehicle position detector 204. In this example, the vehicle position detector 204 provides means for determining if the vehicle 102 has arrived at a location associated with usage of the ladder 104. The vehicle position detector 204 analyzes the sensor data from the vehicle control sensor(s) 124 to determine a location of the vehicle 102. In other examples, the vehicle position detector 204 receives data from the vehicle controller 114 indicating a position of the vehicle 102. The vehicle position detector 204 analyzes the vehicle position data based on one or more ladder usage rules 206. The ladder usage rule(s) 206 can be defined based on user input(s) and stored in the database 202.

The ladder usage rule(s) 206 can define location(s) in an environment where usage of the ladder 104 is permitted. For instance, in an environment such as an inventory storage warehouse, the location(s) at which usage of the ladder 104 is permitted can be defined based on the height of a shelf at the location(s). In this example, the vehicle position detector 204 compares the location of the vehicle 102 to the location(s) defined in the ladder usage rule(s) 206 to determine if the vehicle 102 has arrived at a location associated with use of the ladder 104.

In examples in which the vehicle 102 includes the handle(s) 127 that are separately coupled to the frame of the vehicle 102 from the ladder 104, the ladder controller 128 includes a handle state detector 208. The handle state detector 208 provides means for detecting a state of the handle(s) 127 based on data from the handle position sensor(s) 129. In particular, the handle state detector 208 analyzes the sensor data from the handle position sensor(s) 129 to determine if the handle(s) 127 are in a folded state or an unfolded state. For example, the handle state detector 208 can analyze proximity sensor data to detect a position of the handle(s) relative to a frame of the vehicle 102 and/or image data to identify a state of the handle(s) 127.

The ladder lock controller 210 of the example ladder controller 128 of FIG. 2 provides means for controlling the lock(s) 126 (e.g., electric lock(s)) to enable the ladder 104 to be unfolded when the vehicle 102 has arrived at a location where usage of the ladder 104 is permitted. The ladder lock controller 210 generates and transmits instructions to cause the lock(s) 126 to move from a locked state to an unlocked state in response to data from the vehicle position detector 204 indicating that the vehicle 102 has arrived at a location associated with ladder usage. Thus, when the vehicle 102 is not at a location associated with ladder usage, the ladder lock controller 210 prevents the ladder 104 from being unfolded. However, in other examples, the ladder lock controller 210 can instruct the lock(s) 126 to unlock based on other factor(s) such as user input(s) (e.g., via the user device 120) and/or rule(s) defining that when, for example, the vehicle 102 is not moving, the lock(s) 126 should be unlocked.

In some examples, the ladder lock controller 210 generates the instructions to release the lock(s) 126 in response to data from the handle state detector 208 indicating that the handle(s) 127 are unfolded. In such examples, the ladder lock controller 210 prevents the ladder 104 from being unfolded until the handle(s) 127 are unfolded to prevent or reduce usage of the ladder 104 without the handle(s) 127.

The example ladder controller 128 of FIG. 2 includes a ladder state detector 212 and a vehicle drive mode controller 214. The vehicle drive mode controller 214 determines allowable drive mode(s) (e.g., autonomous drive mode, manual mode) of the vehicle 102 based on the state of the ladder 104 as determined by the ladder state detector 212 and drive mode rule(s) 216 stored in the database 202. The drive mode rule(s) 216 can be defined by user input(s). The drive mode rule(s) 216 provides a mapping of the respective states of the ladder 104 and corresponding drive modes of the vehicle 102 that are permitted, restricted, or prevented based on the state of the ladder 104.

The ladder state detector 212 analyzes data received from one or more the ladder lock controller 210, the electrical lock(s) 126, the ladder position sensor(s) 130, and/or the user detection sensor(s) 132 to determine (e.g., predict, identify, recognize) the state of the ladder 104 as being in one of the stowed state, the unlocked state, the deployed state, or the in-use state.

In the example of FIG. 2, the ladder state detector 212 determines that the ladder 104 is in the stowed state based on data from the ladder lock controller 210 and/or signal(s) output by the electric lock(s) 126 indicating that the lock(s) 126 are in a locked or activated state. When the ladder state detector 212 determines that the ladder 104 is in the stowed state, the vehicle drive mode controller 214 determines, based on the vehicle drive mode rule(s) 216, that the vehicle 102 can operate in the autonomous drive mode and the manual mode because the ladder 104 is secured to the frame of the vehicle 102. In such examples, the vehicle drive mode controller 214 generates and transmits instruction(s) to the vehicle controller 114 and/or the motor controller 108 to enable the vehicle 102 to be operable in the autonomous drive mode and the manual mode.

The ladder state detector 212 determines that ladder 104 is in the unlocked state based on data from the ladder lock controller 210 and/or signal(s) output by the lock(s) 126 indicating that the lock(s) 126 are in an unlocked or deactivated state and data from the ladder position sensor(s) 130 indicating that the ladder 104 is in a folded or partially folded state relative to the vehicle frame. For instance, the ladder lock controller 210 can determine that the ladder 104 is in the unlocked state based on data from the ladder lock controller 210 indicating that the lock(s) 126 are unlocked and data from the ladder position sensor(s) 130 indicating that at least a portion of the ladder 104 is proximate to the lock(s) 126. In such examples, the ladder state detector 212 determines that the ladder 104 is unlocked but not yet unfolded by the user.

In the example of FIG. 2, when the ladder 104 is in the unlocked state, the vehicle drive mode controller 214 generates instructions, based on the drive mode rule(s) 216, to permit operation of the vehicle 102 in the manual mode but to restrict operation of the vehicle 102 in the autonomous drive mode (e.g., prevent operation in the autonomous drive mode or permit the autonomous drive mode with speed restrictions). For instance, because the ladder 104 is unlocked relative to the frame of the vehicle 102, the drive mode rule(s) 216 can define that that autonomous drive mode is not permitted to avoid instances of the vehicle 102 moving around the environment with the ladder 104 in the unlocked state. However, the drive mode rule(s) 216 can permit the vehicle 102 to operate in the manual mode to enable a user to position (e.g., more precisely position) the vehicle 102 relative to, for instance, an object to be retrieved at the location.

In the example of FIG. 2, the ladder state detector 212 determines that the ladder 104 is in the deployed state based on data from the ladder position sensor(s) 130 indicating that a position of the ladder 104 relative to the frame of the vehicle 102 has changed relative to the position of the ladder 104 in the unlocked state. For instance, if the proximity sensor(s) 130 on the frame of the vehicle 102 are no longer outputting signals indicating that a portion of the ladder 104 is proximate to the vehicle frame, the ladder state detector 212 determines that the ladder 104 has moved away from the frame of the vehicle 102 (i.e., is unfolded). Similarly, the position sensor(s) 130 coupled to the ladder 104 can output signal(s) indicating movement and/or change(s) in position of portion(s) of the ladder 104 to indicate unfolding of the ladder 104.

In some examples, the ladder state detector 212 monitors a time for which the ladder 104 is in the unlocked state. In some examples, if the ladder state detector 212 determines that the ladder 104 has not moved from the unlocked state to the deployed state within a threshold period of time, the ladder lock controller 210 instructs the lock(s) 126 to reactivate to lock (i.e., re-lock) the ladder 104 to the frame of the vehicle 102. The time threshold for the ladder 104 to remain in the unlocked state can be defined by time threshold rule(s) 218. The ladder state detector 212 can compare the time for which signal(s) from the ladder position sensor(s) 130 indicate that the ladder 104 is in the unlocked state to the time threshold defined by the time threshold rule(s) 218. In examples disclosed herein, the ladder lock controller 210 instructs the lock(s) 126 to re-lock the ladder 104 if the time threshold for the ladder 104 to move to the deployed state is exceeded. The time threshold rule(s) 218 enables the ladder to be deployed within a period of time but prevents the ladder 104 from remaining in the unlocked state while, for instance, the user has walked away from the vehicle 102. The time threshold rule(s) 218 are defined by user input(s) and stored in the database 202.

In the example of FIG. 2, when the ladder 104 is in the deployed state, the vehicle drive mode controller 214 generates (or maintains) instructions to enable the vehicle 102 to operate in the manual mode but to restrict operation of the vehicle 102 in the autonomous drive mode. In some examples, the drive mode rule(s) 216 permit the vehicle 102 to operate in the manual mode when the ladder 104 is in the deployed state to enable the user to position (e.g., more precisely position) the vehicle 102 and, thus, the ladder 104, relative to an object to be retrieved. For instance, in a warehouse environment, the vehicle 102 may autonomously drive and park at a location proximate to a shelf including an object to be retrieved. However, the position at which the vehicle 102 parked may be too far from the shelf for the user to reach the object when the user is on the ladder 104 based on, for instance, an arm length of the user. Permitting the vehicle 102 to operate in the manual mode when the ladder 104 is deployed allows the user to position (e.g., more precisely position) the vehicle 102 and, thus, the ladder 104 relative to the object to be retrieved to decrease a distance between the object and the user when the user is on the ladder 104.

In some examples, the drive mode rule(s) 216 defines speeds at which the vehicle 102 can move when operating in the manual mode (or, in some instances, the autonomous drive mode) when the ladder 104 is deployed. Such speeds may be lower speeds than speeds that would be permitted if the vehicle 102 was operating in the manual mode (e.g., the manual drive mode) or the autonomous drive mode with the ladder 104 in the stowed state. The vehicle drive mode controller 214 transmits instructions, including any restrictions on speed at which the vehicle 102 when the ladder 104 is deployed, to the motor controller 108.

In other examples, the drive mode rule(s) 216 can indicate that no movement of the vehicle 102 is permitted when the ladder 104 is in the deployed state. In such examples, the vehicle drive mode controller 214 generates and transmits instructions to the motor controller 108 to cause the vehicle 102 to refrain from operating in the autonomous drive mode and the manual mode when the ladder state detector 212 determines that the ladder 104 is in the deployed state.

In the example of FIG. 2, the ladder state detector 212 determines that the ladder 104 is in the in-use state based on data from the ladder position sensor(s) 130 indicating that the ladder 104 has been deployed (e.g., unfolded) and data from the user detection sensor(s) 132 indicating that at least a portion of a body of the user or an object is in contact with the ladder 104. In some examples, the ladder state detector 212 identifies a change in weight at least a portion of the ladder 104 based on the data from the user detection sensor(s) 132. In other examples, the ladder state detector 212 analyzes image data from the user detection sensor(s) 132 to detect contact between the user and the ladder 104 using machine vision analysis.

In response to the ladder state detector 212 determining that the ladder 104 is in the in-use state, the vehicle drive mode controller 214 generates and transmits instructions to the motor controller 108 to prevent movement of the vehicle 102 while the ladder 104 is in the in-use state. In the example of FIG. 2, the vehicle drive mode controller 214 prevents the vehicle 102 from moving in the autonomous drive mode and the manual mode when the ladder 104 is in use. Such instructions from the vehicle drive mode controller 214 causes the motor controller 108 and/or other portions of the drive mechanism(s) of the vehicle 102 (e.g., the motor switches 110, the motor(s) 106) to refrain from responding to user input(s) received via the vehicle control input device(s) 117 and/or input(s) received from other sources (e.g., the processor 118 of the user device 120 of FIG. 1, the cloud-based device(s) 122 of FIG. 1).

The ladder state detector 212 continues to monitor the data received from the ladder position sensor(s) 130 and/or the user detection sensor(s) 132 to detect changes in the states of the ladder 104. For example, based on changes in the data from the user detection sensor(s) 130, the ladder state detector 212 can determine that the ladder 104 has moved from the in-use state to the deployed state (i.e., the user is no longer on the ladder 104). As another example, the ladder state detector 212 can determine that the ladder 104 has moved from the deployed state to the unlocked state based on changes in the data from the ladder position sensor(s) 130 indicating that a portion of the ladder 104 is located closer to the frame of the vehicle 102 than in the deployed state, thereby indicating that the ladder 104 has been re-folded. Similarly, in examples in which the vehicle 102 includes the separately moveable handle(s) 127, the handle state detector 208 monitors for changes in the position of the handle(s) 127 (e.g., from an unfolded position to a folded position).

The vehicle drive mode controller 214 generates (e.g., updates) the instructions with respect to the allowable drive modes of the vehicle 102 based on the changes in the ladder states detected by the ladder state detector 212 and the drive mode rule(s) 216. For instance, after previously restricting movement of the vehicle 102 in response to the ladder 104 being in the in-use state, the vehicle drive mode controller 214 can generate instructions permitting the vehicle 102 to operate in the manual mode in response to data from the ladder state detector 212 indicating the ladder 104 has moved from the in-use state to the deployed state.

Also, the ladder lock controller 210 generates instructions to cause the lock(s) 126 to reactivate to lock to the ladder 104 relative to the vehicle 102 when the ladder state detector 212 determines that the ladder 104 is in (e.g., has returned to) the unlocked state. The ladder state detector 212 can determine that the ladder 104 has returned to the unlocked state when at least a portion of the ladder 104 is proximate to a stowed position of the ladder 104, thereby indicating that the ladder 104 can be re-locked to the frame of the vehicle 102. In some examples, the vehicle drive mode controller 214 generates instructions to enable (e.g., re-enable) the vehicle 102 to operate in the autonomous drive mode in response to data from the ladder state detector 212 indicating that the ladder 104 is in the stowed state and data from the handle state detector 208 indicating that the handle(s) 127 are in a folded state.

As disclosed herein, in some examples, a user may adjust a position of the vehicle 102 via the manual mode after the vehicle 102 has arrived and parked at a location via the autonomous drive mode and while the ladder 104 is in the deployed state. For instance, the user may reposition the vehicle 102 when the ladder 104 is in the deployed state to (e.g., more precisely) locate the ladder 104 relative to an object to be retrieved. In the example of FIG. 2, the vehicle position detector 204 detects adjustments to the position of the vehicle 102 while the vehicle is operating in the manual mode with the ladder 104 deployed. The position(s) to which the vehicle 102 is moved via the manual mode while the ladder 104 is deployed are stored in the database 202 as vehicle position change data 220.

The example ladder controller 128 includes a vehicle position optimizer 222 to determine a position (e.g., a preferred position, an optimal position) of the vehicle 102 at a location in the environment associated with usage of the ladder 104. In the example of FIG. 2, the vehicle position optimizer 222 executes a first neural network model 236 to determine the position of the vehicle 102 at location(s) associated with usage of the ladder 104.

The example system 100 includes one or more computing systems 224 to train neural network(s) to determine a position at which to park the vehicle 102 in the autonomous drive mode at a location associated with usage of the ladder 104. The example neural network computing system(s) 224 of FIG. 2 include hardware and/or software, including at least one processor. In some examples, one or more components of the neural network computing system 224 are implemented by the on-board processor 116 (FIG. 1) of the vehicle 102.

The example neural network computing system 224 includes a neural network processor 226. In examples disclosed herein, the neural network processor 226 implements a first neural network. The example computing system 224 of FIG. 2 includes a neural network trainer 228. The example neural network trainer 228 of FIG. 2 performs training of the first neural network implemented by the first neural network processor 226.

The example neural network computing system 224 of FIG. 2 includes a training controller 230. The example training controller 230 instructs the neural network trainer 228 to perform training of the first neural network based on first training data 232. In the example of FIG. 2, the first training data 232 used by the neural network trainer 228 to train the first neural network is stored in a database 234.

In the example of FIG. 2, the first training data 232 includes position data for the vehicle 102 at location(s) in an environment associated with ladder usage. In the example of FIG. 2, the first training data 232 includes the vehicle position change data 220, or the position data associated with the manual adjustment(s) of the position(s) of the vehicle 102 by one or more users when the ladder 104 is in the deployed state at a particular location. The neural network trainer 228 trains the first neural network implemented by the neural network processor 226 using the first training data 232 to identify the position at which the vehicle 102 or another autonomous vehicle should park relative to the inventory to be retrieved to enable user(s) of the vehicle 102 to retrieve the inventory via the ladder 104 without further adjustments to the position of the vehicle 102 (or other autonomous vehicles including the ladder 104). A location-based position model 236 is generated as a result of the neural network training. The location-based position model 236 is stored in a database 238. The databases 234, 238 may be the same storage device or different storage devices.

The vehicle position optimizer 222 executes the location-based position model 236 to determine the position at which the vehicle 102 should be parked when the vehicle 102 arrives at a particular location in the environment to enable the user to use the ladder 104 without further adjustment of the vehicle 102 in the manual mode. The vehicle position optimizer 222 communicates the position determined via execution of the location-based position model 236 to the vehicle controller 114.

The location-based position model 236 of FIG. 2 can be refined based on the vehicle position change data 220 collected over time in response to adjustments to the position of the vehicle 102 at one or more locations by one or more users of the vehicle 102 to determine a position (e.g., an optimal position) for the vehicle 102 at the respective locations. As result of the machine-learning feedback, manual adjustments to the position of the vehicle 102 when the ladder 104 is deployed are reduced over time. In some examples, the location-based position model 236 is used to position other autonomous vehicles in the environment at the respective locations.

In some examples, the vehicle position optimizer 222 determines a position (e.g., a preferred position, an optimal position) of the vehicle 102 at location(s) in the environment associated with usage of the ladder 104 based on user preference(s). For example, a user may re-position the vehicle 102 when the ladder 104 is deployed based on characteristics of the user (e.g., user height, user arm span, user preference with respect to ascending the ladder 104 in view of a fear of heights, etc.). In the example of FIG. 2, the vehicle position change data 220 can include indications of the user(s) who performed the adjustment(s) the position(s) of the vehicle 102 at the location(s) associated with the ladder usage. In the example of FIG. 2, the vehicle position optimizer 222 can execute a second neural network model 240 to determine a position of the vehicle 102 at location(s) associated with usage of the ladder 104 based on the user associated with the vehicle 102.

In the example of FIG. 2, second training data 242 used by the neural network trainer 228 of the neural network computing system 224 to train a second neural network. The second training data 242 is stored in a database 234. In the example of FIG. 2, the second training data 242 includes position data for the vehicle 102 at location(s) associated with ladder usage (e.g., position data at location(s) in an environment labeled where a ladder may be deployed)

labeled with the one or more users of the vehicle 102 who performed the adjustments. In the example of FIG. 2, the second training data 242 includes the vehicle position change data 220, or the position data associated with the manual adjustment of the position of the vehicle 102 when the ladder 104 is in the deployed state at a particular location and including the user who performed the position adjustment(s). The neural network trainer 228 trains the second neural network implemented by the neural network processor 226 using the second training data 242 to identify the position at which the vehicle 102 should park relative to the inventory to be retrieved to enable a particular user of the vehicle 102 to retrieve the inventory via the ladder 104 without further adjustment to the position of the vehicle 102 based on user preferences. A user-based position model 240 is generated as a result of the neural network training. The user-based position model 240 is stored in a database 238.

In some examples, the vehicle position optimizer 222 executes the user-based position model 240 to determine the position at which the vehicle 102 should be parked when the vehicle 102 arrives at a particular location in the environment and when the vehicle 102 is associated with a particular user to enable that user to use the ladder 104 without further adjustment of the vehicle 102 in the manual mode. The vehicle position optimizer 222 communicates the position determined via execution of the user-based position model 240 to the vehicle controller 114.

The user-based position model 240 can be refined based on the vehicle position change data 220 collected over time from a particular user in response to adjustment(s) to the position(s) of the vehicle 102 or other autonomous vehicles in the environment by that user when the ladder 104 is deployed to determine a position (e.g., an optimal position) for the vehicle 102 at location(s) in the environment. In some examples, the user-based position model 240 is refined based on data collected from two or more users in response to similarities in adjustment(s) of the position(s) of the vehicle 102 or other vehicles by the users. In some such examples, the user-based position model 240 can be implemented for other users of the vehicle 102 or other autonomous vehicles based on similarities of user properties of between users (e.g., user height). Thus, the user-based position model 240 can be applied to similar users of the vehicle 102 or other vehicles based on properties of the users. As result of the machine-learning feedback based on user preferences, manual adjustments to the position of the vehicle 102 when the ladder 104 is deployed are reduced over time.

While an example manner of implementing the ladder controller 210 of FIG. 1 is illustrated in FIG. 2, one or more of the elements, processes and/or devices illustrated in FIG. 2 may be combined, divided, re-arranged, omitted, eliminated and/or implemented in any other way. Further, the example database 202, the example vehicle position detector 204, the example handle state detector 208, the example ladder lock controller 210, the example ladder state detector 212, the example vehicle drive mode controller 214, the example vehicle position optimizer 222, and/or, more generally, the example ladder controller 128 of FIG. 2 may be implemented by hardware, software, firmware and/or any combination of hardware, software and/or firmware. Thus, for example, any of the example database 202, the example vehicle position detector 204, the example handle state detector 208, the example ladder lock controller 210, the example ladder state detector 212, the example vehicle drive mode controller 214, the example vehicle position optimizer 222 and/or, more generally, the example ladder controller 128 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example database 202, the example, the vehicle position detector 204, the example handle state detector 208, the example ladder lock controller 210, the example ladder state detector 212, the example vehicle drive mode controller 214, and/or the example vehicle position optimizer 222 is/are hereby expressly defined to include a non-transitory computer readable storage device or storage disk such as a memory, a digital versatile disk (DVD), a compact disk (CD), a Blu-ray disk, etc. including the software and/or firmware. Further still, the example ladder controller 128 of FIG. 2 may include one or more elements, processes and/or devices in addition to, or instead of, those illustrated in FIG. 2, and/or may include more than one of any or all of the illustrated elements, processes, and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 3:
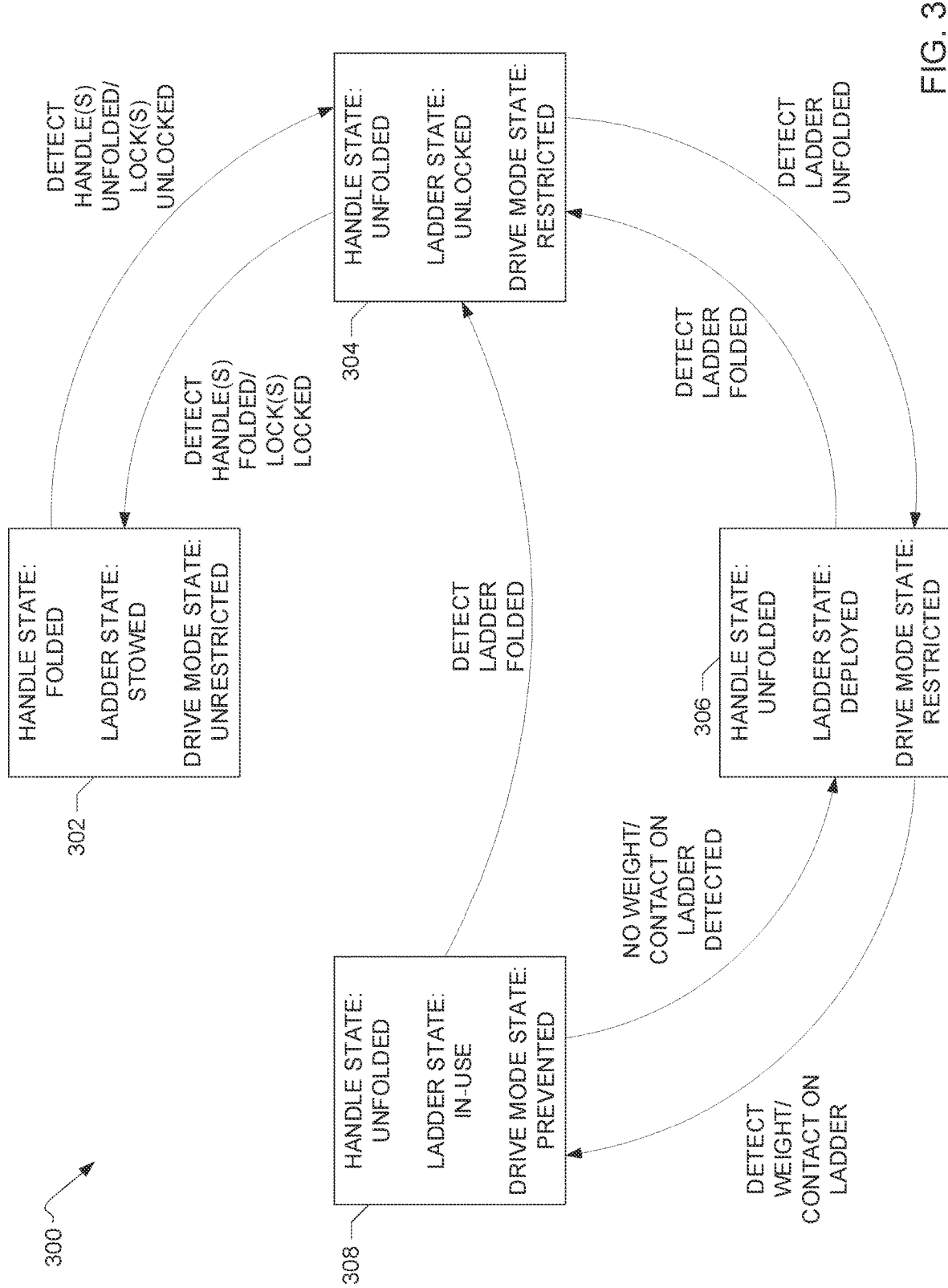
FIG. 3 is an example state diagram representing transitions between different drive modes of the example autonomous vehicle of FIG. 1 in response to the different states of the ladder.

FIG. 3 is an example state diagram 300 representing transitions between different drive modes of the example autonomous vehicle 102 of FIG. 1 in response to the different states of the ladder 104 of FIG. 1.

The example state diagram 300 of FIG. 3 includes a first state 302 in which the handle state detector 208 of the example ladder controller 128 of FIG. 2 determines that the handle(s) 127 are in the folded position based on data from the handle position sensor(s) 129. Also, in the first state 302, the ladder state detector 212 of the example ladder controller 128 of FIG. 2 determines that the ladder 104 is in the stowed state 302 in response to data from the ladder lock controller 210 and/or the electric lock(s) 126 indicating that the lock(s) 126 are locked. In the illustrated example, the vehicle drive mode controller 214 of the example ladder controller 128 of FIG. 2 permits the vehicle 102 to operate in an unrestricted drive mode state when the handle state detector 208 determines that the handle(s) 127 are in the folded position and the ladder state detector 212 determines that the ladder 104 is in the stowed state. In the example of FIG. 3, the unrestricted drive mode state enables the vehicle 102 to operate in the autonomous drive mode (e.g., automated locomotion of the vehicle 102) and the manual mode (e.g., the manual drive mode to cause locomotion of the vehicle 102 in response to user input(s) received at the vehicle 102 via the vehicle control input device(s) 117; the user-powered mode in which the vehicle 102 moves at least partially due to application of user force to the vehicle 102 (e.g., pushing)).

The example state diagram 300 of FIG. 3 includes a second state 304 in which the handle state detector 208 determines that the handle(s) 127 are in the unfolded position based on data from the handle position sensor(s) 129. Also, in the second state 304, the ladder state detector 212 determines that the ladder 104 is in the unlocked state in response to data from the ladder lock controller 210 and/or the electric lock(s) 126 indicating that the lock(s) 126 are unlocked. In the example of FIG. 3, when the handle state detector 208 determines that the handle(s) 127 are in the unfolded position and the ladder state detector 212 determines that the ladder 104 is in the unlocked state, the vehicle drive mode controller 214 causes the vehicle 102 to transition from the unrestricted drive mode state to a restricted drive mode state. In the example of FIG. 3, the restricted drive mode state enables the vehicle 102 to operate in the manual mode, however, the autonomous drive mode is restricted (e.g., movement of the vehicle 102 in the autonomous drive mode is limited to reduced speeds or the vehicle 102 is prevented from moving in the autonomous drive mode).

In some examples, the ladder state detector 212 determines that the ladder 104 has moved from the unlocked state 304 to the stowed state 302 if the ladder 104 has not been deployed (e.g., unfolded) within a threshold period of time and the ladder lock controller 210 instructs the lock(s) 127 to re-lock the ladder 104 to the vehicle 102. In such examples, the example state diagram 300 transitions from the second state 304 to the first state 302 as illustrated in FIG. 3.

The example state diagram 300 of FIG. 3 includes a third state 306 in which the handle(s) 127 are unfolded and the ladder state detector 212 determines that the ladder 104 is in the deployed state based on signal(s) output by the ladder position sensor(s) 130 indicating a change in position of one or more portions of the ladder 104 relative to the frame of the vehicle 102 (e.g., signal(s) or an absence of signal(s) indicating an increased distance between a portion of the ladder 104 and the vehicle frame, thereby indicating unfolding of the ladder). In the example of FIG. 3, the vehicle drive mode controller 214 maintains the vehicle 102 in the restricted drive mode state when the ladder state detector 212 determines that the ladder 104 is in the deployed state. As disclosed herein, the vehicle drive mode controller 214 permits the vehicle 102 to operate in the restricted drive mode state to enable the user to manually position the vehicle 102 while the ladder 104 is deployed.

The example state diagram 300 of FIG. 3 includes a fourth state 308 in which the handle(s) 127 are unfolded and the ladder state detector 212 determines that the ladder 104 is in the in-use state 308 based on signal(s) output by the user detection sensor(s) 132 indicating a change in weight on at least a portion of the ladder 104 and/or contact of at least a portion of the user and/or an object with the ladder 104 (e.g., indicating that the user has ascended at least a portion of the ladder 104). In the example of FIG. 3, when the ladder state detector 212 determines that the ladder 104 is in the in-use state, the vehicle drive mode controller 214 causes the vehicle 102 to transition from the restricted drive mode state to a prevented drive mode state. In the example of FIG. 3, the vehicle 102 is prevented from operating in the autonomous drive mode and the manual mode when the ladder 104 is in use (e.g., when the user is in contact with at least a portion of the ladder 104).

In some examples, the ladder state detector 212 determines that the ladder 104 has moved from the in-use state to the deployed state when data from the user detection sensor(s) 132 detects a change in weight indicating an absence of user weight on or contact with the ladder 104. In some examples, the ladder state detector 212 determines that the ladder 104 has returned to the unlocked state from the deployed state or the in-use state in response to data from the ladder position sensor(s) 130 indicating that at least a portion of the ladder 104 is proximate to the frame of the vehicle 102 in a position for stowage. The ladder state detector 212 determines that the ladder 104 has moved from the unlocked state to the stowed state when the handle(s) 127 have been folded and the locks have been (re-)activated by the ladder lock controller 210 to secure the ladder 104 to the vehicle 102. As shown in the example state diagram 300 of FIG. 3, the vehicle drive mode controller 214 causes the vehicle 102 to transition between the drive mode states based on the ladder states (e.g., to move from the prevented drive mode state to the restricted drive mode state in response to the ladder 104 moving from the in-use state to deployed state; to move from the restricted drive mode state to the unrestricted drive mode state in response to the ladder 104 moving to the stowed state).

Although the example state diagram 300 of FIG. 3 is discussed in connection with the handle state detector 208, the ladder state detector 212, and the vehicle drive mode controller 214 of the example ladder controller 128 of FIG. 2, detection of the handle state and/or the ladder state and/or control of the drive mode states of the vehicle 102 can additionally or alternatively be performed by, for instance, the motor controller 108 and/or the vehicle controller 114 of the vehicle 102. Also, in some examples, a state of the handle(s) 127 is not separately determined from a state of the ladder 104 and, instead, the states 302, 304, 306, 308 of FIG. 3 are based on the ladder state and the drive mode state. Also, in some examples, the control of the drive mode states of the vehicle 102 is additionally or alternatively performed by the motor switch(es) 110 and/or the brake(s) 105 in response to signal(s) output by the ladders position sensor(s) 130 and/or the user detection sensor(s) 132.

Figure 4:
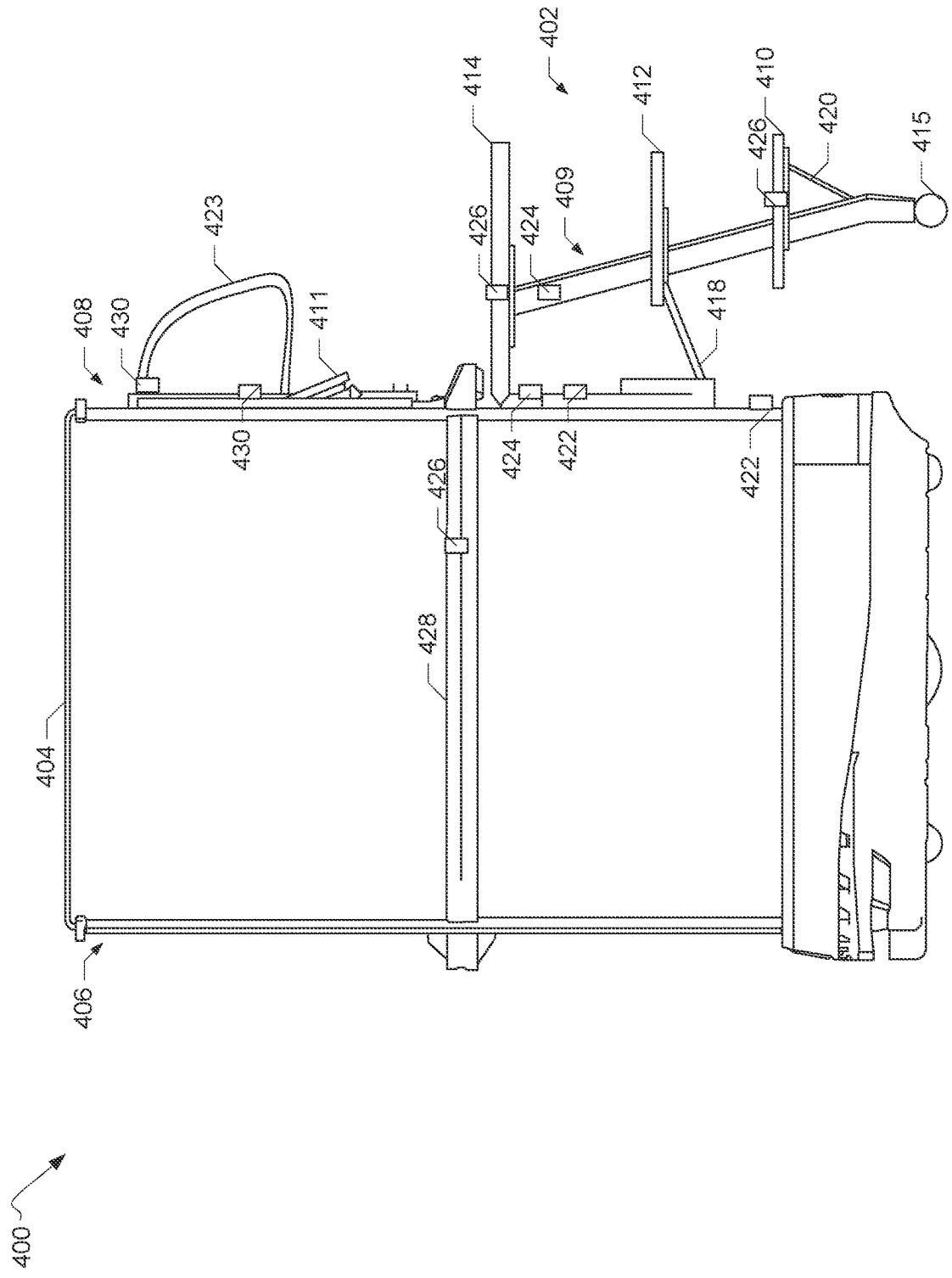
FIG. 4 illustrates an example autonomous vehicle that can be used to implement the autonomous vehicle of FIG. 1, the autonomous vehicle including a ladder in a first state.

FIG. 4 illustrates an example autonomous vehicle 400 (e.g., the autonomous vehicle 102 of FIG. 1) including a ladder 402 (e.g., the ladder 104 of FIG. 1) in accordance with teachings of this disclosure. In the example of FIG. 4, the vehicle 400 is a cart to carry objects placed onto a frame 404 of the vehicle 400.

The frame 404 of the example vehicle 400 of FIG. 4 defines a first end 406 (e.g., a front end) of the vehicle 400 and a second end 408 (e.g., a rear end) of the vehicle 400. The frame 404 carries a display screen 411 (e.g., the display screen 111 of FIG. 1). The frame 404 carries other mechanical and/or electrical components of the vehicle 400 (e.g., on exterior of the frame 404 or within housing(s) defined by portion(s) of the frame 404). A shape, size, and/or other features of the vehicle 400 including the frame 404 can differ from the example shown in FIG. 4.

In the example of FIG. 4, the ladder 402 is coupled to the frame 404 at the second end 408 of the vehicle 400. In other examples, the ladder 402 is coupled to the first end 406 of the frame 404. In some examples, the ladder 402 is removably coupled to the frame 404 via mechanical fastener(s). In some examples, the ladder 402 is an accessory for the vehicle 400 that is selectively coupled to the frame 404 of the vehicle. In other examples, one or more portions of the ladder 402 may be formed as a single piece with one or more portions of the frame 404 of the vehicle 400.

The example ladder 402 of FIG. 4 includes frame 409 to support a first step 410, a second step 412, and a third step 414 of the ladder 402. The ladder 402 can include additional or fewer steps. In some examples, a size (e.g., width and/or depth) of the third step 414 is greater than a size of the first and second steps 410, 412 to enable a user to turn his or her feet while standing on the third step 414. The example ladder 402 includes one or more wheels 415 coupled to the frame 409. However, in other examples, the ladder 402 does not include the wheel(s) 415.

In the example of FIG. 4, the frame 409 and the steps 410, 412, 414 of the ladder 402 are movable relative to the frame 404 of the vehicle 400 to enable the ladder 402 to move between a folded position and the unfolded position. For instance, two or more portions of the ladder frame 409 can be moveable relative to each other to enable the frame 409 to fold or collapse. In the example of FIG. 4, a portion of the third step 414 is pivotably coupled to the frame 404 of the vehicle 400 to enable the third step of the ladder 402 to move relative to the frame 404. In the example of FIG. 4, a portion of the second step 412 is pivotably coupled to the vehicle frame 404 via a first linkage 418 to enable the second step 412 to move relative to the vehicle frame 404. Also, the first step 410 is pivotably coupled to the frame 409 of the ladder 402 via a second linkage 420 to enable the first step 410 to collapse relative to the ladder frame 409. A shape, size, and/or other features of the ladder 402 and/or components thereof (e.g., the steps 410, 412, 414) can differ from the example shown in FIG. 4.

In the example of FIG. 4, the ladder 402 is shown in a deployed state or state in which the ladder 402 is unlocked from the vehicle frame 404 and unfolded. In the example of FIG. 4, the frame 404 of the vehicle 400 includes one or more locks 422 to receive and secure a portion of the ladder 402 when the ladder 402 is in the folded state. In some examples, corresponding portions of the lock(s) 422 are located on the vehicle frame 404 and the ladder 402. The lock(s) 422 can be located at different location(s) on the vehicle frame 404 than shown in FIG. 4.

The example ladder 402 includes two handles 423, a first one of which is shown in FIG. 4. In the example of FIG. 4, the handles 423 are spaced apart from the ladder 402 and can move (e.g., pivot) relative to the vehicle frame 404 independently of the frame 409 of the ladder 402. However, in other examples, the handles 423 are coupled to the frame 409 of the ladder 402. In the deployed state, the example ladder 402 of FIG. 4 can provide for three points of contact of a user with the ladder 402 and the handles 423 (e.g., two feet on the ladder 402 and one hand on the handle 423).

In the example of FIG. 4, one or more ladder position sensors 424 (e.g., the ladder position sensor(s) 130 of FIG. 1 such as proximity sensors) are carried by the ladder 402 and/or the vehicle frame 404. Also, one or more user detection sensors 426 (e.g., the user detection sensor(s) 132 of FIG. 1 such as weight sensors) are carried by the ladder 402 and/or the vehicle frame 404. For example, the user detection sensor(s) 426 can sense changes in weight on the step(s) 410, 412, 414 indicating that the user is ascending the ladder 402. In some examples, the user detection sensor(s) 426 detect changes in weight on the vehicle frame 404, such as a shelf 428 of the vehicle 400, as indicative of use of the ladder 402 (e.g., the user is loading items on the vehicle 400 while the ladder 402 is deployed). In the example of FIG. 4, one or more handle position sensor(s) 430 (e.g., the handle position sensor(s) 129 of FIG. 1) are carried by the ladder 402 and/or the vehicle frame 404.

Figure 5:
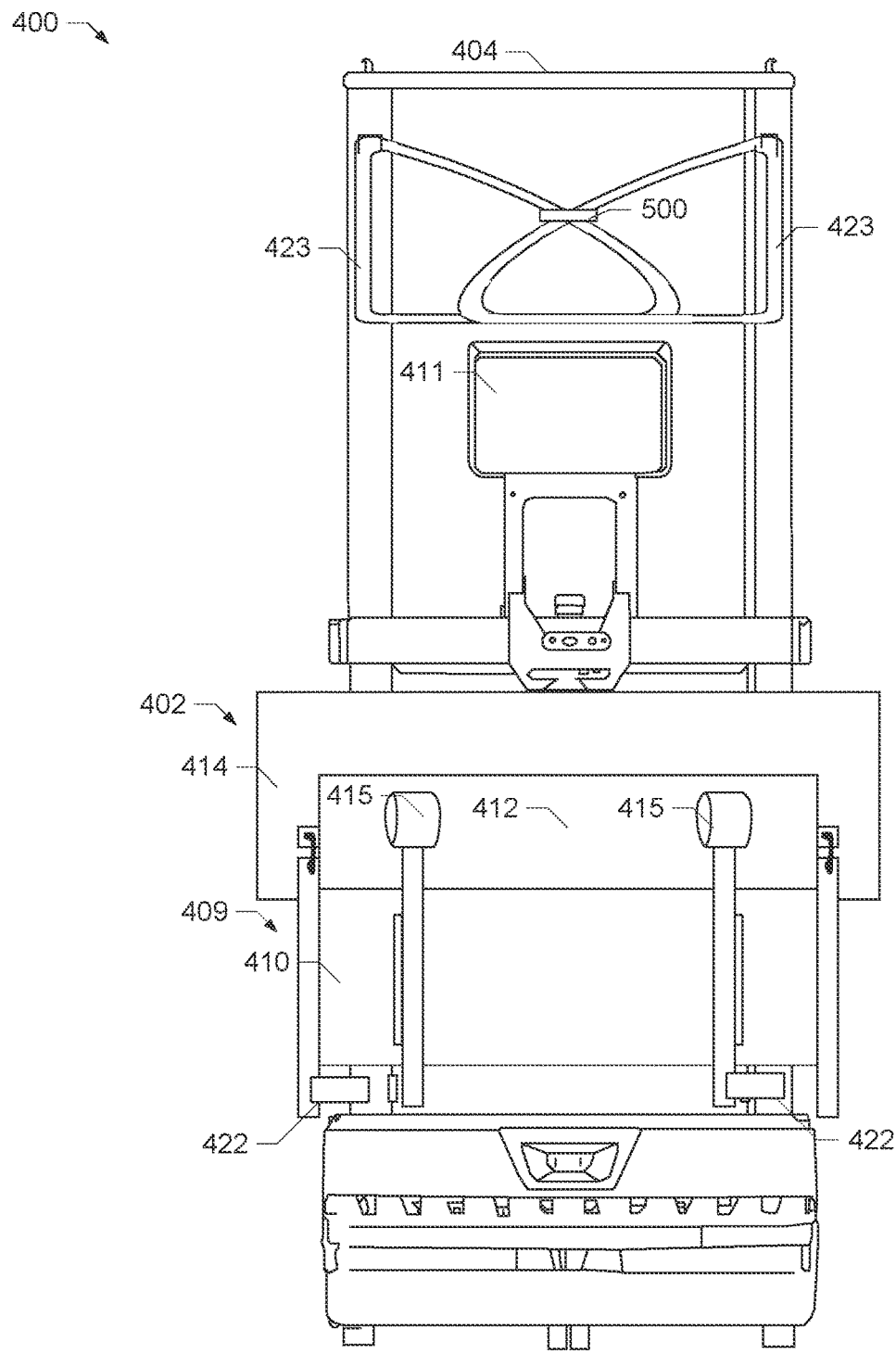
FIG. 5 illustrates the example autonomous vehicle of FIG. 5 including the ladder in a second state.

FIG. 5 illustrates the ladder 402 of the example autonomous vehicle 400 of FIG. 4 in stowed state. As shown in the example of FIG. 5, the frame 409 and the steps 410, 412, 414 of the ladder 402 are collapsed relative to the positions of the frame 409 and the steps 410, 412, 414 when the ladder 402 is in the deployed state illustrated in FIG. 4. The locks 422 secure one or more portions of the ladder 402 to the vehicle frame 404 of vehicle 400 Also, as shown in FIG. 5, the handles 423 are pivoted to a folded position. In this example, a handle lock 500 (e.g., a latch) secures the handles 423 in the folded position to prevent the handles 423 from unfolding during movement of the vehicle 400. In other examples, the handles 423 are spring biased to the folded position and/or include other means for securing the handles 423 in the folded position.

Figure 6A:
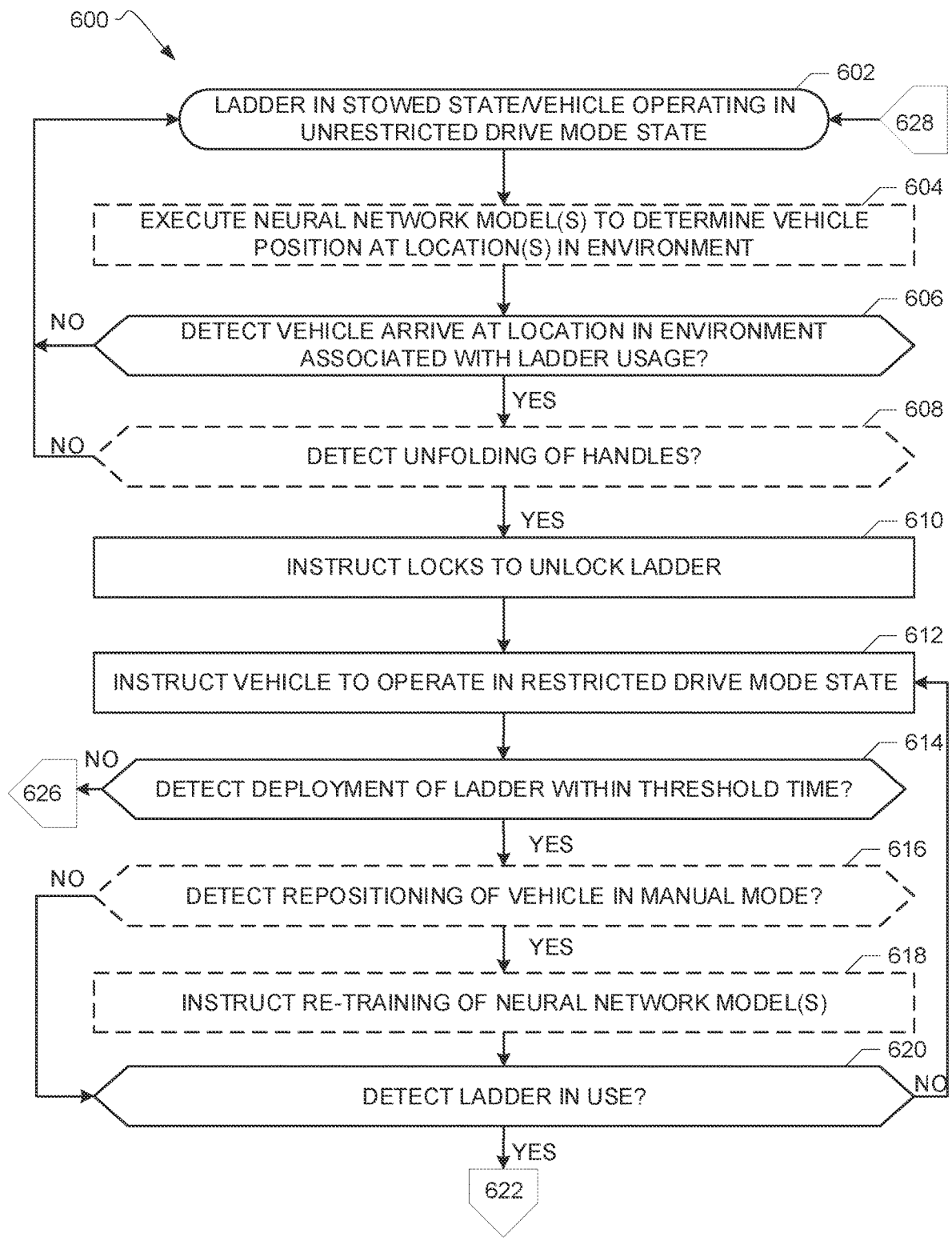
FIGS. 6A and 6B include a flowchart representative of example machine readable instructions that, when executed, cause the example ladder controller of FIGS. 1 and/or 2 to control a drive mode of the example autonomous vehicle of FIGS. 1, 4, and/or 5 based on a state of the example ladder of FIGS. 1, 4, and/or 5.
Figure 6B:
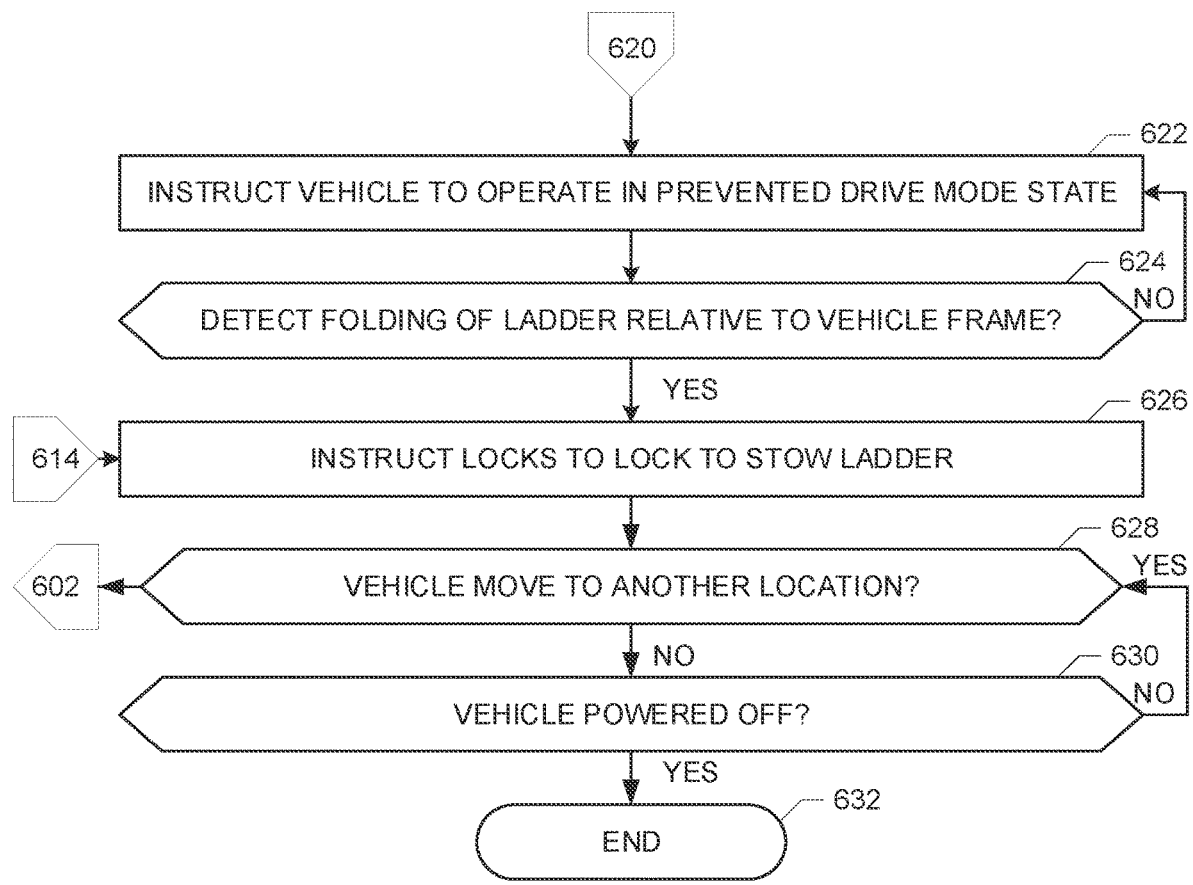

A flowchart representative of example hardware logic, machine readable instructions, hardware implemented state machines, and/or any combination thereof for implementing the ladder controller 128 of FIGS. 1 and/or 2 is shown in FIGS. 6A and 6B. The machine readable instructions may be one or more executable programs or portion(s) of an executable program for execution by a computer processor and/or processor circuitry, such as the processor 712 shown in the example processor platform 700 discussed below in connection with FIG. 7. The program may be embodied in software stored on a non-transitory computer readable storage medium such as a CD-ROM, a floppy disk, a hard drive, a DVD, a Blu-ray disk, or a memory associated with the processor 712, but the entire program and/or parts thereof could alternatively be executed by a device other than the processor 712 and/or embodied in firmware or dedicated hardware. Further, although the example program is described with reference to the flowchart illustrated in FIGS. 6A and 6B, many other methods of implementing the example ladder controller 128 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 6A and 6B may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIGS. 6A and 6B include flowcharts representative of example machine readable instructions 600 that, when executed, cause the example ladder controller 128 of FIGS. 1 and/or 2 to control a drive mode of the example autonomous vehicle 102, 400 of FIGS. 1, 4, and/or 5 based on a state of the example ladder 104, 402 of FIGS. 1, 4, and/or 5. The example instructions can be implemented by one or more of the processor 116 of the autonomous vehicle 102 of FIG. 1, the processor 118 of the user device 120 of FIG. 1, and/or the cloud-based device(s) 122.

The example instructions 600 of FIGS. 6A and 6B begin when the ladder 104, 402 is in a stowed state (e.g., as shown in the illustrated example of FIG. 5). At block 602, the vehicle drive mode controller 214 of FIG. 2 generates instructions to cause the vehicle 102, 400 to operate in an unrestricted drive mode state, or a state in which the vehicle 102, 400 is permitted to operate in the autonomous drive mode and the manual mode.

In some examples, at block 604, the vehicle position optimizer 222 executes the location-based position neural network model 236 and/or the user-based position neural network model 240 to determine a position (e.g., an optimal position) at which the vehicle 102, 400 should be positioned (e.g., parked) at a location in an environment associated with ladder usage. The neural network model(s) 236, 240 are generated via neural network training based on, for example, previous repositioning of the vehicle 102, 400 by user(s) at location(s) in the environment, user preferences with respect to usage of the ladder, and/or user characteristics (e.g., user height).

At block 606, the vehicle position detector 204 of FIG. 2 determines if the vehicle 102, 400 has arrived at a location in the environment associated with ladder usage. In some examples, the vehicle position detector 204 determines that the vehicle 102, 400 has arrived at a location associated with ladder usage based on vehicle position data from the vehicle control sensor(s) 124 and the ladder usage rule(s) 206. If the vehicle 102, 400 has not arrived at a location associated with ladder usage, the ladder 104, 402 remains in the stowed state.

In some examples, at block 608, when the vehicle position detector 204 determines that the vehicle 102, 400 has arrived at a location associated with ladder usage, the handle state detector 208 determines if the handles 127, 423 have been moved from a folded position to an unfolded position. At block 610, if the handle state detector 208 determines that the handles 127, 423 have not been unfolded, the ladder 104, 402 remains in the stowed state. If the handle state detector 208 determines that the handles 127, 423 have been unfolded, the ladder lock controller 210 instructs the lock(s) 126, 422 to unlock to enable the ladder 104, 402 to be deployed (e.g., unfolded). In examples in which the vehicle 102, 400 does not include handles 127, 423 that are separately coupled to the vehicle from other portions of the ladder 104, 402, control proceeds from block 606 to block 610.

At block 612, the vehicle drive mode controller 214 generates instructions to cause the vehicle 102, 400 to operate in a restricted drive mode state in which the autonomous drive mode is restricted (e.g., prevented or enabled with limitations on a speed of autonomous movement of the vehicle 102, 400) and the manual mode is permitted based on the drive mode rule(s) 216. The vehicle drive mode controller 214 transmits the instructions to the motor controller 108.

At block 614, the ladder state detector 212 determines if the ladder 104, 402 has moved from an unlocked state to a deployed state (e.g., an unfolded state) based on data from the ladder position sensor(s) 130 (e.g., proximity sensor data, image data). If the ladder state detector 212 determines that the ladder 104, 402 has not moved to the deployed state within a threshold period of time defined by the time threshold rule(s) 218, the ladder lock controller 210 instructs the lock(s) 126, 422 to re-lock the ladder 104, 402 to the frame 404 of the vehicle 102, 400 (block 620).

In some examples, at block 616, the vehicle position detector 204 determines that the vehicle 102, 400 has been repositioned by a user via the manual mode (e.g., the manual drive mode, the user-powered mode) while the ladder 104, 402 is in the deployed state. In such examples, at block 618, the vehicle position optimizer 222 instructs the neural network model(s) 236, 240 to be retrained or refined based on the vehicle position change data 220.

In this example, the vehicle 102, 400 remains in the restricted drive mode state until the ladder state detector 212 determines that the ladder 104, 402 is in the in-use state at block 620. The ladder state detector 212 determines that the ladder 104, 402 is in use based on data from the user detection sensor(s) 132 (e.g., data indicating a change in weight on the ladder 104, 402, image data). At block 622, the vehicle drive mode controller 214 generates instructions to cause the vehicle 102, 400 to move to the prevented drive mode state, or a state in which the vehicle is prevented from operating in the autonomous drive mode and the manual mode (i.e., no movement of the vehicle 102, 400 is allowed). The vehicle drive mode controller 214 transmits the instructions to the motor controller 108.

The vehicle drive mode controller 214 maintains the vehicle 102, 400 in the prevented drive mode state until the ladder state detector 212 determines at block 624 that the ladder has been (re-)folded relative to the vehicle frame (e.g., based on data from the ladder position sensor(s) 130 indicating a proximity of one or more portions of the ladder 104 to the vehicle frame in the stowed position). In response to the folding of the ladder 104, 402, the ladder lock controller 210 instructs the lock(s) 126 to lock the ladder 104, 402 in the stowed position at block 626. At block 628, the ladder 104, 402 is maintained in the stowed position until the vehicle 102, 400 arrives at another location in the environment associated with ladder usage (blocks 602, 606). The example instructions 600 of FIGS. 6A and 6B end when the vehicle 102, 400 is powered off (blocks 630, 632).

Figure 7:
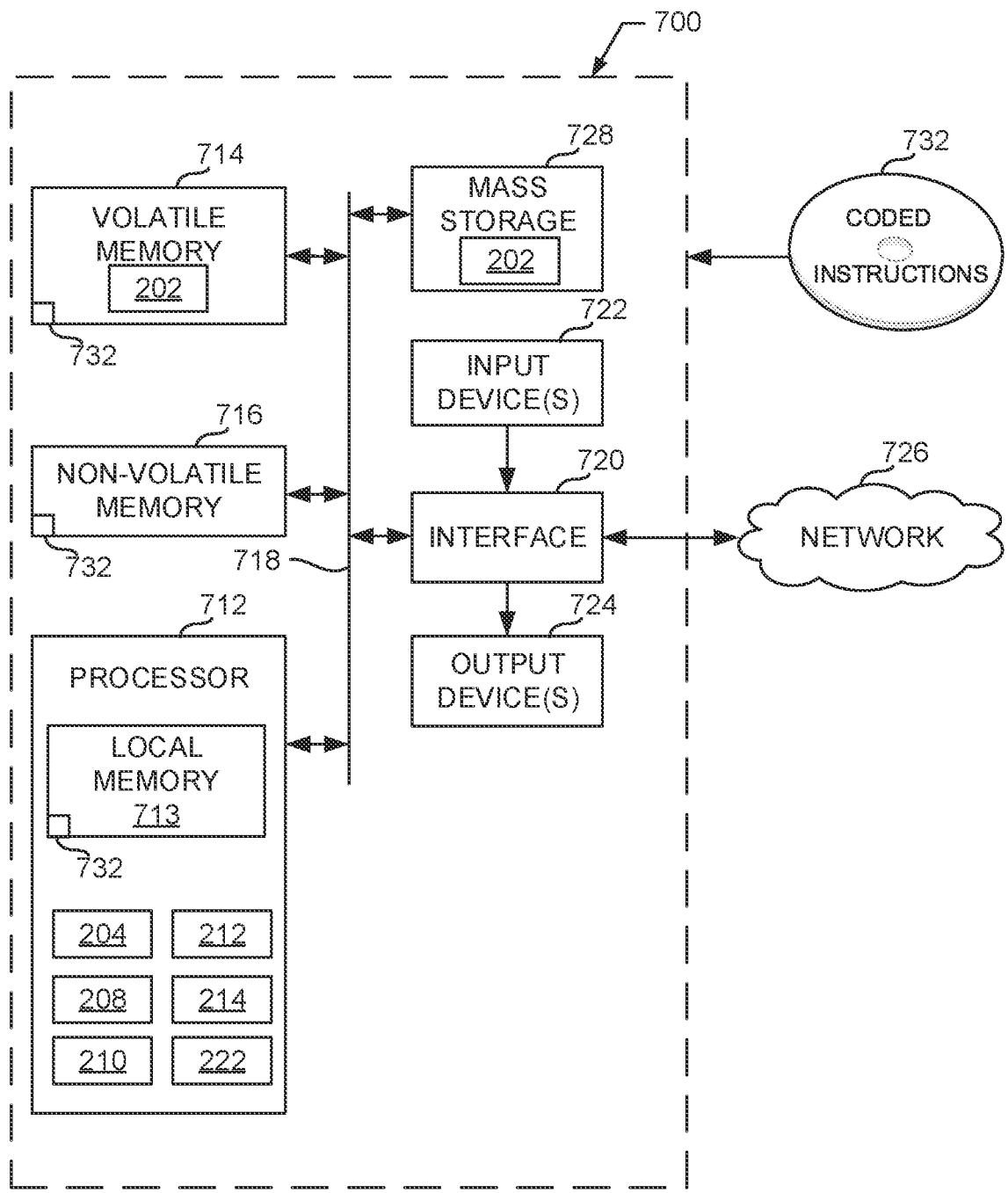
FIG. 7 is a block diagram of an example processing platform structured to execute the instructions of FIGS. 6A and 6B to implement the example ladder controller of FIGS. 1 and/or 2.

FIG. 7 is a block diagram of an example processor platform 700 structured to execute the instructions of FIGS. 6A and 6B to implement the example ladder controller 128 of FIGS. 1 and/or 2. The processor platform 700 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a headset or other wearable device, or any other type of computing device.

The processor platform 700 of the illustrated example includes a processor 712. The processor 712 of the illustrated example is hardware. For example, the processor 712 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example vehicle position detector 204, the example handle state detector 208, the example ladder lock controller 210, the example ladder state detector 212, the example vehicle drive mode controller 214, and the example vehicle position optimizer 222.

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), a Bluetooth® interface, a near field communication (NFC) interface, and/or a PCI express interface.

In the illustrated example, one or more input devices 722 are connected to the interface circuit 720. The input device(s) 722 permit(s) a user to enter data and/or commands into the processor 712. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 720 of the illustrated example, thus, typically includes a graphics driver card, a graphics driver chip and/or a graphics driver processor.

The interface circuit 720 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 726. The communication can be via, for example, an Ethernet connection, a digital subscriber line (DSL) connection, a telephone line connection, a coaxial cable system, a satellite system, a line-of-site wireless system, a cellular telephone system, etc.

The processor platform 700 of the illustrated example also includes one or more mass storage devices 728 for storing software and/or data. Examples of such mass storage devices 728 include floppy disk drives, hard drive disks, compact disk drives, Blu-ray disk drives, redundant array of independent disks (RAID) systems, and digital versatile disk (DVD) drives.

The machine executable instructions 732 of FIGS. 6A and 6B may be stored in the mass storage device 728, in the volatile memory 714, in the non-volatile memory 716, and/or on a removable non-transitory computer readable storage medium such as a CD or DVD.

From the foregoing, it will be appreciated that example methods, apparatus and articles of manufacture have been disclosed that provide for an autonomous vehicle including a ladder and safety interlocks that regulate a drive mode of the autonomous vehicle based on the state of the ladder (e.g., stowed, in-use). The safety interlocks can be software- and/or hardware-based to provide for dynamic operational control of the vehicle in response to movement of the ladder between different ladder states. Some examples disclosed herein provide for machine-based learning of user behavior with respect to usage of the ladder to provide for efficient use of the ladder and the vehicle. Accordingly, examples disclosed herein provide for a safe operating environment in view of use of the ladder with the autonomous vehicle.

Example methods, apparatus, systems, and articles of manufacture for autonomous vehicles including ladders are disclosed herein. Further examples and combinations thereof include the following:

Example 1 includes a system including an autonomous vehicle including an integrated ladder and a processor to detect a state of the ladder as being in one of a stowed state, a deployed state, or a use state; in response to detecting that the ladder is in the stowed state, cause the autonomous vehicle to operate in a first drive mode and a second drive mode; in response to detecting that the ladder is in the deployed state, cause the autonomous vehicle to operate in the second drive mode and to restrict from operating in the first drive mode; and in response to detecting that the ladder is in the use state, cause the autonomous vehicle to refrain from operating in the first drive mode and the second drive mode.

Example 2 includes the system of example 1, wherein the ladder is carried by a frame of the autonomous vehicle.

Example 3 includes the system of example 1, wherein the first drive mode is an autonomous drive mode and the second drive mode is a manual mode.

Example 4 includes the system of example 1, wherein the processor is to: determine a position of the autonomous vehicle relative to a location of an object to be retrieved; and generate, based on the location of the autonomous vehicle, an instruction to cause a lock to move from a locked state to an unlocked state to enable the ladder to move from the stowed state to the deployed state.

Example 5 includes the system of example 4, wherein the autonomous vehicle is a first autonomous vehicle, the position is a first position of the first autonomous vehicle relative to the object, and the processor is to detect a change in position of the first autonomous vehicle from the first position to a second position relative to the location of the object to be retrieved, the change in response to the first autonomous vehicle operating in the second drive mode and instruct a second autonomous vehicle to move to the second position relative to the location.

Example 6 includes the system of example 4, wherein the object is a first object and the position is a first position of the autonomous vehicle relative to the first object and the processor is to detect a change in position of the autonomous vehicle from the first position to a second position relative to the location of the first object, the change in response to the autonomous vehicle operating in the second drive mode; and instruct the autonomous vehicle to move to a third position relative to a location of a second object based on the second position of the autonomous vehicle relative to the location of the first object.

Example 7 includes the system of example 1, further including a sensor, the processor to detect that the ladder is in the use state based on one or more signals output by the sensor, the one or more signals indicative of a change of weight on the ladder.

Example 8 includes the system of example 7, wherein the sensor is coupled to at least one of a frame of the autonomous vehicle or the ladder.

Example 9 includes the system of example 1, wherein the processor is to detect that the ladder has moved from the deployed state to the stowed state and, in response to the detecting that the ladder has moved from the deployed state to the stowed state, generate an instruction to cause the autonomous vehicle to operate in the first drive mode and the second drive mode.

Example 10 includes an autonomous vehicle including an integrated ladder; a sensor for detecting that the ladder is in use; and a braking mechanism coupled to the sensor, wherein the braking mechanism engages when the ladder is in use.

Example 11 includes the autonomous vehicle of example 10, wherein the sensor is a first sensor, the ladder is moveable between a stowed state and a deployed state, the ladder being usable in the deployed state, and the autonomous vehicle further includes a second sensor for determining whether the ladder is the stowed state or the deployed state, and a drive mechanism coupled to the second sensor and capable of operating in a first drive mode and a second drive mode, wherein the drive mechanism is restricted from operating in the first drive mode when the ladder is in the deployed state.

Example 12 includes the autonomous vehicle of example 11, wherein the drive mechanism is further coupled to the first sensor, and wherein the drive mechanism is restricted from operating in the first drive mode and the second drive mode when the ladder is in use.

Example 13 includes the autonomous vehicle of example 11, wherein the first drive mode is an autonomous drive mode and the second drive mode is a manual mode.

Example 14 includes the autonomous vehicle of example 10, wherein the sensor is a weight sensor.

Example 15 includes the autonomous vehicle of example 10, further including a processor to determine a first position of the autonomous vehicle relative to a location of a first object to be retrieved; detect a change in position of the autonomous vehicle from the first position to a second position relative to the location of the first object to be retrieved; and instruct the autonomous vehicle to move to the second position relative to a location of a second object to be retrieved.

Example 16 includes the autonomous vehicle of example 15, wherein the processor is to associate the second position with a first user of the autonomous vehicle.

Example 17 includes the autonomous vehicle of example 16, wherein the processor is to instruct the autonomous vehicle to move to the second position relative to the location of the first object to be retrieved when the autonomous vehicle is associated with a second user.

Example 18 includes the autonomous vehicle of example 17, wherein the processor is to detect a change in position of the autonomous vehicle from the second position to a third position relative to the location of the first object to be retrieved when the autonomous vehicle is associated with the second user and instruct the autonomous vehicle to move to the third position relative to the location of the first object when the autonomous vehicle is associated with the first user or a third user.

Example 19 includes the autonomous vehicle of example 17, wherein the processor is to execute a neural network to determine a third position of the autonomous vehicle relative to a location of a third object to be retrieved.

Example 20 includes an autonomous vehicle including a ladder moveable between a stowed state and a deployed state and means for determining the state of the ladder as between the stowed state and the deployed state, wherein autonomous locomotion of the autonomous vehicle is prevented while the ladder is determined to be in the deployed state.

Example 21 includes the autonomous vehicle of example 20, further including means for determining that the ladder is in use, wherein all locomotion of the autonomous vehicle is prevented while the ladder is determined to be in use.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. A system comprising:
an autonomous vehicle including an integrated ladder;
machine-readable instructions; and
at least one processor circuit to be programmed by the machine-readable instructions to:
  detect a state of the ladder as being in one of a stowed state, a deployed state, or a use state;
  in response to detecting that the ladder is in the stowed state, cause the autonomous vehicle to operate in a first drive mode and a second drive mode;
  in response to detecting that the ladder is in the deployed state, cause the autonomous vehicle to operate in the second drive mode and to restrict from operating in the first drive mode; and
  in response to detecting that the ladder is in the use state, cause the autonomous vehicle to refrain from operating in the first drive mode and the second drive mode.

2. The system of claim 1, wherein the ladder is carried by a frame of the autonomous vehicle.

3. The system of claim 1, wherein the first drive mode is an autonomous drive mode and the second drive mode is a manual mode.

4. The system of claim 1, wherein one or more of the at least one processor circuit is to:
determine a position of the autonomous vehicle relative to a location of an object to be retrieved; and
generate, based on the location of the autonomous vehicle, an instruction to cause a lock to move from a locked state to an unlocked state to enable the ladder to move from the stowed state to the deployed state.

5. The system of claim 4, wherein the autonomous vehicle is a first autonomous vehicle, the position is a first position of the first autonomous vehicle relative to the object, and one or more of the at least one processor circuit is to:
  detect a change in position of the first autonomous vehicle from the first position to a second position relative to the location of the object to be retrieved, the change in response to the first autonomous vehicle operating in the second drive mode; and
  instruct a second autonomous vehicle to move to the second position relative to the location.

6. The system of claim 4, wherein the object is a first object and the position is a first position of the autonomous vehicle relative to the first object and one or more of the at least one processor circuit is to:
  detect a change in position of the autonomous vehicle from the first position to a second position relative to the location of the first object, the change in response to the autonomous vehicle operating in the second drive mode; and
  instruct the autonomous vehicle to move to a third position relative to a location of a second object based on the second position of the autonomous vehicle relative to the location of the first object.

7. The system of claim 1, further including a sensor, wherein one or more of the at least one processor circuit is to detect that the ladder is in the use state based on one or more signals output by the sensor, the one or more signals indicative of a change of weight on the ladder.

8. The system of claim 7, wherein the sensor is coupled to at least one of a frame of the autonomous vehicle or the ladder.

9. The system of claim 1, wherein one or more of the at least one processor circuit is to:
  detect that the ladder has moved from the deployed state to the stowed state; and
  in response to the detecting that the ladder has moved from the deployed state to the stowed state, generate an instruction to cause the autonomous vehicle to operate in the first drive mode and the second drive mode.

10. An autonomous vehicle comprising:
an integrated ladder;
one or more sensors;
a braking mechanism coupled to the one or more sensors, wherein the braking mechanism engages when the ladder is in a use state;
machine-readable instructions; and
at least one processor circuit to be programmed by the machine-readable instructions to:
  detect, based on outputs of the one or more sensors, a state of the ladder as being in one of a stowed state, a deployed state, or the use state;
  in response to detecting that the ladder is in the stowed state, cause the autonomous vehicle to operate in a first drive mode and a second drive mode;
  in response to detecting that the ladder is in the deployed state, cause the autonomous vehicle to operate in the second drive mode and to restrict from operating in the first drive mode; and
  in response to detecting that the ladder is in the use state, cause the autonomous vehicle to refrain from operating in the first drive mode and the second drive mode.

11. The autonomous vehicle of claim 10, wherein,
the ladder is usable in the deployed state and
the autonomous vehicle further includes
a drive mechanism capable of operating in the first drive mode and the second drive mode, wherein the drive mechanism is restricted from operating in the first drive mode when the ladder is in the deployed state.

12. The autonomous vehicle of claim 11, wherein the drive mechanism is restricted from operating in the first drive mode and the second drive mode when the ladder is in use.

13. The autonomous vehicle of claim 11, wherein the first drive mode is an autonomous drive mode and the second drive mode is a manual mode.

14. The autonomous vehicle of claim 10, wherein the one or more sensors includes a weight sensor.

15. The autonomous vehicle of claim 10, wherein one or more of the at least one processor circuit is to:
  determine a first position of the autonomous vehicle relative to a location of a first object to be retrieved;
  detect a change in position of the autonomous vehicle from the first position to a second position relative to the location of the first object to be retrieved; and
  instruct the autonomous vehicle to move to the second position relative to a location of a second object to be retrieved.

16. An autonomous vehicle comprising:
  an integrated ladder;
  one or more sensors;
  a braking mechanism coupled to the one or more sensors, wherein the braking mechanism engages when the ladder is in a use state
  machine-readable instructions; and
  at least one processor circuit to be programmed by the machine-readable instructions to:
    determine a first position of the autonomous vehicle relative to a location of a first object to be retrieved;
    detect a change in position of the autonomous vehicle from the first position to a second position relative to the location of the first object to be retrieved;
    associate the second position with a first user of the autonomous vehicle; and
    instruct the autonomous vehicle to move to the second position relative to a location of a second object to be retrieved.

17. The autonomous vehicle of claim 16, wherein one or more of the at least one processor circuit is to instruct the autonomous vehicle to move to the second position relative to the location of the first object to be retrieved when the autonomous vehicle is associated with a second user.

18. The autonomous vehicle of claim 17, wherein one or more the at least one processor circuit is to:
  detect a change in position of the autonomous vehicle from the second position to a third position relative to the location of the first object to be retrieved when the autonomous vehicle is associated with the second user; and
  instruct the autonomous vehicle to move to the third position relative to the location of the first object when the autonomous vehicle is associated with the first user or a third user.

19. The autonomous vehicle of claim 17, wherein one or more of the at least one processor circuit is to execute a neural network to determine a third position of the autonomous vehicle relative to a location of a third object to be retrieved.

* * * * *